United States Patent
Kim et al.

(10) Patent No.: US 10,431,211 B2
(45) Date of Patent: Oct. 1, 2019

(54) DIRECTIONAL PROCESSING OF FAR-FIELD AUDIO

(71) Applicant: QUALCOMM Incorporated, San Diego, CA (US)

(72) Inventors: Lae-Hoon Kim, San Diego, CA (US); Erik Visser, San Diego, CA (US); Asif Mohammad, San Diego, CA (US); Ian Ernan Liu, San Diego, CA (US); Ye Jiang, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 327 days.

(21) Appl. No.: 15/387,411

(22) Filed: Dec. 21, 2016

(65) Prior Publication Data

US 2018/0033428 A1 Feb. 1, 2018

Related U.S. Application Data

(60) Provisional application No. 62/368,499, filed on Jul. 29, 2016.

(51) Int. Cl.
*G10L 21/0208* (2013.01)
*G10L 15/20* (2006.01)
(Continued)

(52) U.S. Cl.
CPC .............. *G10L 15/20* (2013.01); *G10L 15/08* (2013.01); *G10L 15/22* (2013.01); *G10L 21/028* (2013.01);
(Continued)

(58) Field of Classification Search
CPC ........... G10L 20/0208; G10L 2015/088; G10L 2021/02166; G10L 21/02; G10L 15/00; G10L 21/0208; H04R 3/005; H04R 3/00
See application file for complete search history.

(56) References Cited

U.S. PATENT DOCUMENTS 7,383,178 B2 * 6/2008 Visser ................ G10L 21/0272
704/227
9,373,338 B1 * 6/2016 Gopalan ................ G10L 21/02
(Continued)

FOREIGN PATENT DOCUMENTS

| WO | 2013184299 A1 | 12/2013 |
| WO | 2014189815 A1 | 11/2014 |
| WO | 2015092400 A1 | 6/2015 |

OTHER PUBLICATIONS

International Search Report and Written Opinion—PCT/US2017/038581—ISA/EPO—dated Aug. 11, 2017.

*Primary Examiner* — Michael N Opsasnick
(74) *Attorney, Agent, or Firm* — Toler Law Group, P.C.

(57) ABSTRACT

An apparatus includes multiple microphones to generate audio signals based on sound of a far-field acoustic environment. The apparatus also includes a signal processing system to process the audio signals to generate at least one processed audio signal. The signal processing system is configured to update one or more processing parameters while operating in a first operational mode and is configured to use a static version of the one or more processing parameters while operating in the second operational mode. The apparatus further includes a keyword detection system to perform keyword detection based on the at least one processed audio signal to determine whether the sound includes an utterance corresponding to a keyword and, based on a result of the keyword detection, to send a control signal to the signal processing system to change an operational mode of the signal processing system.

30 Claims, 10 Drawing Sheets

(51) Int. Cl.

| | |
|---|---|
| *G10L 15/08* | (2006.01) |
| *G10L 15/22* | (2006.01) |
| *G10L 21/0232* | (2013.01) |
| *G10L 21/028* | (2013.01) |
| *H04R 3/00* | (2006.01) |
| G10L 21/0216 | (2013.01) |
| H04R 1/40 | (2006.01) |

(52) U.S. Cl.
CPC ...... *G10L 21/0208* (2013.01); *G10L 21/0232* (2013.01); *H04R 3/005* (2013.01); *G10L 2015/088* (2013.01); *G10L 2015/223* (2013.01); *G10L 2021/02166* (2013.01); *H04R 1/406* (2013.01)

(56) References Cited

U.S. PATENT DOCUMENTS

| | | | |
|---|---|---|---|
| 2002/0049587 A1* | 4/2002 | Miyazawa | G10L 15/20 704/233 |
| 2012/0099732 A1 | 4/2012 | Visser | |
| 2012/0221330 A1 | 8/2012 | Thambiratnam et al. | |
| 2013/0259238 A1 | 10/2013 | Xiang et al. | |
| 2013/0282372 A1* | 10/2013 | Visser | G10L 21/0208 704/233 |
| 2015/0047036 A1* | 2/2015 | Lapsley | H04L 63/08 726/23 |
| 2015/0194152 A1 | 7/2015 | Katuri et al. | |
| 2015/0379992 A1 | 12/2015 | Lee et al. | |
| 2016/0182547 A1* | 6/2016 | Lapsley | H04L 63/08 726/23 |
| 2019/0043491 A1* | 2/2019 | Kupryjanow | G10L 21/0208 |
| 2019/0051290 A1* | 2/2019 | Li | G10L 15/16 |
| 2019/0051303 A1* | 2/2019 | Mixter | G10L 15/32 |

\* cited by examiner

DIRECTIONAL PROCESSING OF FAR-FIELD AUDIO

I. CLAIM OF PRIORITY

The present application claims priority from U.S. Provisional Patent Application No. 62/368,499 entitled "FAR-FIELD AUDIO PROCESSING," filed Jul. 29, 2016, the contents of which are incorporated by reference herein in their entirety.

II. FIELD

The present disclosure is generally related to processing sound of a far-field acoustic environment.

III. DESCRIPTION OF RELATED ART

Advances in technology have resulted in smaller and more powerful computing devices. For example, there currently exist a variety of portable personal computing devices, including wireless telephones (e.g., mobile phones and smart phones), tablets, and laptop computers that are small, lightweight, and easily carried by users. These devices can communicate voice and data packets over wireless networks. Further, many such devices incorporate additional functionality, such as a digital still camera, a digital video camera, a digital recorder, or an audio file player. Some of these devices can process executable instructions, including software applications, such as a web browser application, that can be used to access the Internet. As such, these devices can include significant computing capabilities.

As these devices have become more sophisticated, new technologies have been developed to take advantage of the computing capabilities of these devices. For example, voice recognition (also referred to as speech recognition) technologies have been incorporated into portable personal computing devices. Voice recognition enables a user to provide input, such as a command or query, to a computing device by speaking to the computing device. Voice recognition uses significant computing resources and, accordingly, significant power. Thus, for portable computing devices, which generally rely on battery power, technologies have been developed to reduce power demand for voice recognition.

For example, a voice recognition system may be powered down until a user provides input to power up the voice recognition system. The input may include a physical input, such as pressing a button; however, increasingly the input includes speaking a keyword. Thus, voice recognition may be used with keyword detection so that a user can speak a keyword to wake up a voice recognition system and then speak a command or query that is recognized by the voice recognition system.

Keyword detection may be considered a subset of voice recognition; however, keyword detection is a more constrained problem, and therefore uses less processing resources. For example, voice recognition systems may be configured to recognize quite varied voice input, which may include a long and unstructured sequence of sounds, and configured to determine meaning (e.g., words) corresponding to the voice input. In contrast, keyword detection systems may be configured to detect a specific sequence of sounds that corresponds to a keyword (or several sequences of sounds that correspond to several keywords).

When used with a portable computing device, a combination of keyword detection and voice recognition can enable a user to wake up a voice recognition system (using a keyword) and provide a voice input to the voice recognition system without significantly increasing power requirements of the portable computing device. One reason that the combination of keyword detection and voice recognition works well on portable computing devices is that such devices are generally used very close to the user, e.g., in a near-field acoustic environment. In a near-field acoustic environment, a microphone of the portable computing device may be positioned very near a user's face such that the user's voice (as detected at the microphone) is be much louder than ambient sound (e.g., noise), resulting in a large signal to noise ratio (SNR). Additionally, multipath (e.g., reflected sound of the user's voice) can generally be ignored in the portable computing device context.

However, when a computing device that uses keyword detection and voice recognition is used in a far-field acoustic environment, different challenges arise. For example, the SNR at the computing device may be significantly lower because a microphone of the computing device may be further from the user (and/or closer to a noise source). Additionally, the microphone may be closer to a wall or other source of reflected sound than to the user, in which case reflected sound (e.g., multipath) can make processing the voice input challenging.

IV. SUMMARY

Particular implementations described herein facilitate processing voice input (e.g., keyword, voice commands, etc.) in a far-field environment. For example, a device may include a signal processing system that processes audio signals from multiple microphones. The device may also include a keyword detection system that performs keyword detection on processed audio signals from the signal processing system. The keyword detection system may provide feedback (e.g., a control signal) to the signal processing system based on a result of the keyword detection. For example, the signal processing system may be configured to operate in a first operational mode before a keyword is detected and to operate in a second operational mode after a keyword is detected (as indicated by the control signal). In this example, the first operational mode may be optimized (or otherwise configured) to detect voice input from multiple directions, to dynamically adjust parameters to account for a changing acoustic environment (e.g., to adjust signal processing parameters to account for a changes in a noisy room, etc.), or both. In contrast, the second operational mode may be optimized (or otherwise configured) to focus on sound received from the same direction of arrival as the keyword. In the second operational mode, the signal processing system may also, or in the alternative, use different parameters than in the first operational mode to improve detection of or recognition of a voice input that follows the keyword.

In a particular implementation, an apparatus includes multiple microphones to generate multiple audio signals, where each microphone of the multiple microphones is configured to generate a respective audio signal of the multiple audio signals based on sound of a far-field acoustic environment as detected at the microphone. The apparatus also includes a signal processing system to process the multiple audio signals to generate at least one processed audio signal. The apparatus further includes a keyword detection system to perform keyword detection based on the at least one processed audio signal to determine whether the sound includes an utterance corresponding to a keyword and, based on a result of the keyword detection, to send a first control signal to the signal processing system to change an operational mode of the signal processing system from a first operational mode to a second operational mode. A second control signal is sent to the signal processing system, responsive to detecting an end of a voice input associated with the keyword, to cause the signal processing system to change the operational mode of the signal processing system from the second operational mode to the first operational mode.

In another particular implementation, a method for processing sound of a far-field acoustic environment includes obtaining multiple audio signals. Each audio signal of the multiple audio signals is generated by a respective microphone of multiple microphones based on the sound of the far-field acoustic environment as detected at the respective microphone. The method also includes processing, at a signal processing system, the multiple audio signals to generate at least one processed audio signal and performing keyword detection, at a keyword detection system, based on the at least one processed audio signal to determine whether the sound includes an utterance corresponding to a keyword. The method further includes changing an operational mode of the signal processing system from a first operational mode to a second operational mode based on a result of the keyword detection. The method also includes, after changing the operational mode of the signal processing system to the second operational mode and based on detection of an end of a voice input associated with the keyword, changing the operational mode of the signal processing system from the second operational mode to the first operational mode.

In another particular implementation, an apparatus for processing sound of a far-field acoustic environment includes means for generating multiple audio signals, each audio signal of the multiple audio signals generated based on the sound of the far-field acoustic environment. The apparatus also includes means for processing the multiple audio signals to generate at least one processed audio signal and means for keyword detection to determine, based on the at least one processed audio signal, whether the sound includes an utterance corresponding to a keyword. The apparatus further includes means for changing an operational mode of the means for processing the multiple audio signals. The means for changing the operational mode is configured to change the operational mode of the means for processing the multiple audio signals from a first operational mode to a second operational mode based on a result of the keyword detection. The means for changing the operational mode is also configured to, after changing the operational mode of the means for processing the multiple audio signals to the second operational mode, change the operational mode of the means for processing the multiple audio signals from the second operational mode to the first operational mode based on detection of an end of a voice input associated with the keyword.

In another particular implementation, a non-transitory computer-readable medium stores instructions for processing sound of a far-field acoustic environment. The instructions are executable by a processor to cause the processor to perform operations including obtaining multiple audio signals. Each audio signal of the multiple audio signals is generated by a respective microphone of multiple microphones based on the sound of the far-field acoustic environment as detected at the respective microphone. The operations also include processing the multiple audio signals to generate at least one processed audio signal and performing keyword detection based on the at least one processed audio signal to determine whether the sound includes an utterance corresponding to a keyword. The operations further include changing an operational mode of a signal processing system from a first operational mode to a second operational mode based on a result of the keyword detection. The operations also include, after changing the operational mode of the signal processing system to the second operational mode and based on detection of an end of a voice input associated with the keyword, changing the operational mode of the signal processing system from the second operational mode to the first operational mode.

Other implementations, advantages, and features of the present disclosure will become apparent after review of the entire application, including the following sections: Brief Description of the Drawings, Detailed Description, and the Claims.

V. BRIEF DESCRIPTION OF THE DRAWINGS

VI. DETAILED DESCRIPTION

Figure 1:
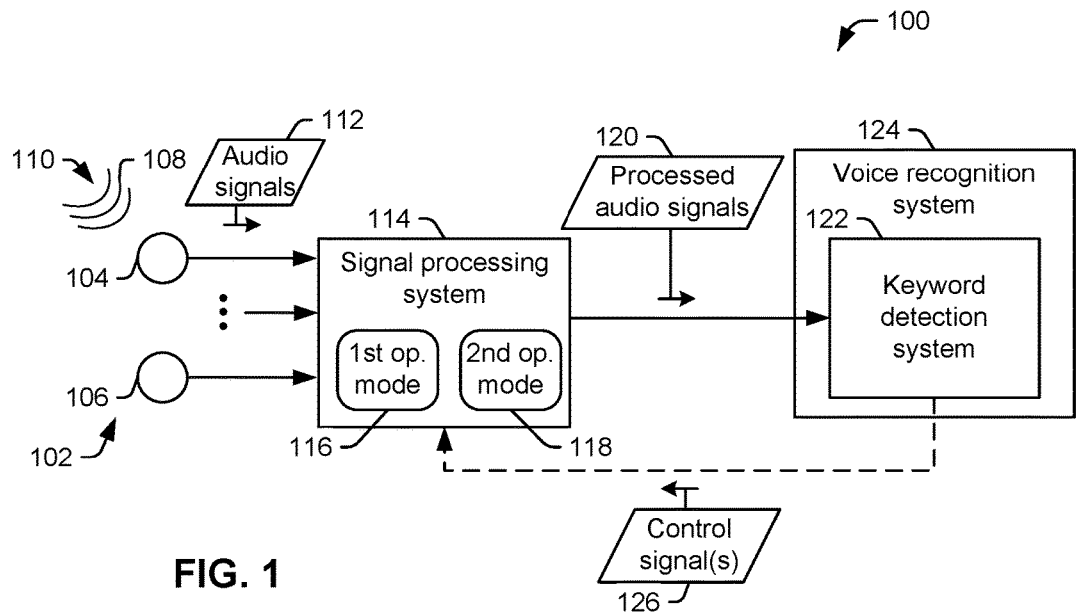
FIG. 1 is a block diagram of a particular illustrative example of an apparatus configured to process sound of a far-field acoustic environment.

FIG. 1 is a block diagram of a particular illustrative example of an apparatus 100 configured to process sound of a far-field acoustic environment 110. The apparatus 100 includes a signal processing system 114 coupled to a keyword detection system 122. As described further below, the keyword detection system 122 is configured to provide a control signal 126 to the signal processing system 114 based on a result of a keyword detection process. The control signal 126 causes the signal processing system 114 to change an operational mode of the signal processing system 114.

Generally, as used herein, the term "acoustic environment" refers to physical space surrounding the apparatus 100 in which sound is present and propagates. The term "far-field" distinguishes the acoustic environment 110 from a "near-field" acoustic environment. While processing sound in a near-field acoustic environment, a particular target sound (e.g., a spoken command or keyword) may have a magnitude that is significantly greater than ambient sound, resulting in a large signal to noise ratio (SNR). Additionally, in a near-field acoustic environment, sound reflected from walls or other objects may have a significantly smaller magnitude than the target sound. As a result, reflected sound can generally be ignored or treated as noise. In contrast, in a far-field acoustic environment, the reflected sound (e.g., a reflected version of the target sound) may have a magnitude that is similar to (e.g., within several dB) of a magnitude of the target sound. Further, the SNR of the target sound may be significantly lower in a far-field acoustic environment than in a near-field acoustic environment. Whether a particular acoustic environment is a near-field acoustic environment or a far-field acoustic environment depends on factors such as a frequency (or frequency range) of the target sound, a magnitude of the target sound, and a physical configuration of or arrangement of the environment, etc. Generally, when the target sound corresponds to a human voice, an acoustic environment may be considered a far-field acoustic environment if a source of the target sound is more than about one meter away from microphones detecting the target sounds, or if reflected versions of the target sound are difficult to distinguish from the target sound (e.g., a ratio of an energy level of the target sound to an energy level of a reflected version of the target sound is less than a threshold). Changing the operational mode of the signal processing system 114 based on keyword detection enables the apparatus 100 to mitigate some of the concerns with process the sound 108 from the far-field acoustic environment 110, as described further below.

In FIG. 1, the apparatus 100 includes multiple microphones 102, such as a first microphone 104, a second microphone 106, and one or more additional microphones (not shown). The microphones 102 are configured to generate multiple audio signals 112. For example, each microphone of the multiple microphones 102 may be configured to generate a respective audio signal of the multiple audio signals 112 based on sound 108 of the far-field acoustic environment 110 as detected at the microphone. To illustrate, the first microphone 104 may detect at least a portion of the sound 108 and may generate a first audio signal of the audio signals 112 based on the portion of the sound 108 detected at the first microphone 104. Likewise, the second microphone 106 may detect at least a portion of the sound 108 and may generate a second audio signal of the audio signals 112 based on the portion of the sound 108 detected at the second microphone 106. The audio signals 112 may include analog signals, digital signals, or both. For example, if the first microphone 104 is analog microphone, the first microphone 104 may generate an analog audio signal; however, if the first microphone 104 is digital microphone (or if the first microphone 104 includes an analog-to-digital converter (ADC) circuit), the first microphone 104 may generate an digital audio signal.

The audio signals 112 are provided to a signal processing system 114. The signal processing system 114 is configured to process the audio signals 112 to generate at least one processed audio signal 120. For example, as explained further below, the signal processing system 114 may process the audio signals using beamforming, nullforming, noise cancellation, or other operations. The signal processing system 114 is configured to operate in one of at least two distinct operational modes. For example, while operating in a first operational mode 116, the signal processing system 114 may configured to "listen" for (e.g., detect) a keyword spoken in the far-field acoustic environment 110, and in a second operational mode 118, the signal processing system 114 may configured to "listen" for (e.g., detect) a voice input spoken in the far-field acoustic environment 110 after the keyword.

The signal processing system 114 may use different signal processing parameters while operating in the first operational mode 116 than while operating in the second operational mode 118. For example, as described in more detail below, the first and second operational modes 116, 118 may use different sampling rates, different beamformer parameters, different nullformer parameters, different noise cancellation parameters, other different processing parameters, or a combination thereof. As another example, the first operational mode 116 may be an adaptive mode, and the second operational mode may be a static mode 118. To illustrate, in the first operational mode 16, a noise cancellation system of the signal processing system 114 may operate in an adaptive mode (e.g., by periodically or occasionally updating a set of adaptive noise cancellation parameters), and in the second operational mode 118, the noise cancellation system may operate in a static mode (e.g., by using static versions of the noise cancellation parameters). In some implementations, the signal processing system 114 may use different signal processing subsystems while operating in the first operational mode 116 than while operating in the second operational mode 118. For example, a beamformer (not shown in FIG. 1) of the signal processing system 114 may be active in the first operational mode 116 and may be inactive in the second operational mode 118, or vice versa. As another example, a nullformer (not shown in FIG. 1) of the signal processing system 114 may be active in the first operational mode 116 and may be inactive in the second operational mode 118, or vice versa. As yet another example, a noise cancellation system (not shown in FIG. 1) of the signal processing system 114 may be active in the first operational mode 116 and may be inactive in the second operational mode 118, or vice versa. Alternatively, or in addition, other subsystems or combinations of subsystems may be active in one operational mode and inactive in another operational mode.

Figure 2:
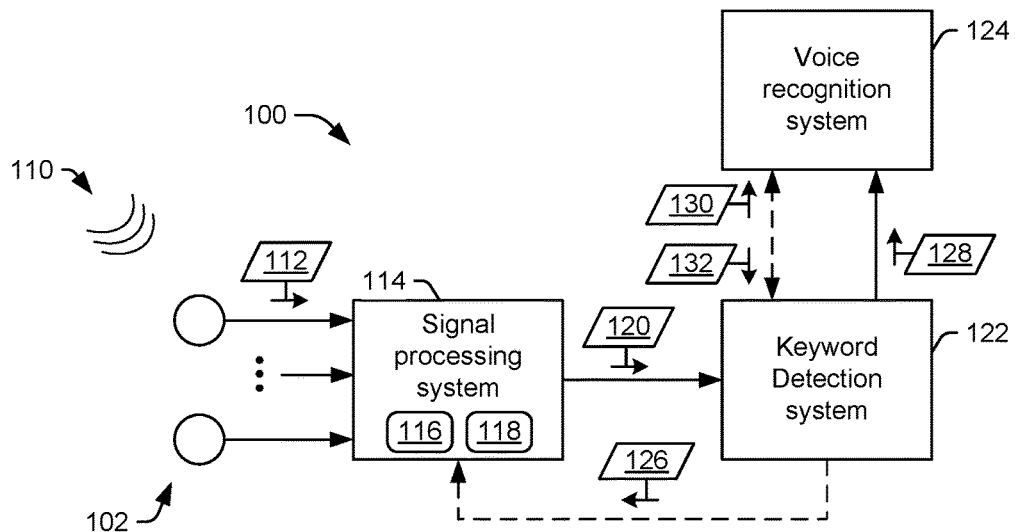
FIG. 2 is a block diagram illustrating a particular implementation of the apparatus of FIG. 1.

In FIG. 1, the keyword detection system 122 is shown as a subsystem of (or a portion of) a voice recognition system 124. In other implementations, the keyword detection system 122 is distinct from the voice recognition system 124. Thus, the keyword detection system 122 may share at least some processing resources with the voice recognition system 124, as illustrated in FIG. 1, or the keyword detection system 122 may use different (e.g., lower power) processing resources than the voice recognition system 124, as illustrated in FIG. 2.

The keyword detection system 122 is configured to perform keyword detection based on the at least one processed audio signal 120 to determine whether the sound 108 includes an utterance corresponding to a keyword. For example, the keyword detection system 122 may process the at least one processed audio signal 120 using a Viterbi search process to identify a set (or sequence) of phonemes corresponding to a keyword. When a keyword is detected, the keyword detection system 122 may activate the voice recognition system 124, or may otherwise indicate to the voice recognition system 124 that the keyword has been detected so that the voice recognition system 124 is prepared to process a voice input that follows the keyword.

The voice recognition system 124 is configured to analyze the processed audio signals 120 to detect a voice input that follows the keyword and to initiate an action based on content of the voice input. To illustrate, the voice input may include a command to execute a function of the apparatus 100, and the voice recognition system 124 may cause the apparatus 100 to execute the function. The function may include a software function (such as opening an application, performing a search, playing a media content item, etc.), a hardware function (such as turning on a light (not shown) or another subsystem of the apparatus 100), or a combination thereof (such as causing an application to select control data for a remote device that is controllable by the apparatus and causing a communication interface of the apparatus to encode and transmit the selected control data).

Additionally, based on a result of the keyword detection, the keyword detection system 122 may send the control signal 126 to the signal processing system 114. For example, the keyword detection system 122 may send the control signal 126 when the keyword is detected in the processed audio signals 120. The control signal 126 may include information related to the keyword (such as a direction of arrival of sound corresponding to the keyword). Alternately, or in addition, the control signal 126 may notify the signal processing system 114 to change its operational mode (e.g., from the first operational mode 116 to the second operational mode 118, or vice versa).

In operation, the signal processing system 114 may operate in the first operational mode 116 during a first time period in which no keyword has been detected and no voice input is being received at the voice recognition system 124. For example, the first time period may correspond to a standby period in which the apparatus 100 is monitoring the far-field acoustic environment 110 to detect a keyword. While operating in the first operational mode 116, the signal processing system 114 is optimized (or otherwise configured) to detect the keyword in the far-field acoustic environment 110. For example, in the first operational mode 116, the signal processing system 114 may perform adaptive signal processing to continuously, periodically, or occasionally update signal processing parameters based on ambient noise or interference in the far-field acoustic environment 110. As another example, in the first operational mode 116, the signal processing system 114 may use static versions of certain signal processing parameters, such as beamformer parameters or nullformer parameters, until a direction of arrival of sound corresponding to the keyword is determined. In this example, the static signal processing parameters may facilitate treating the far-field acoustic environment 110 as a set of adjacent or overlapping sound zones (as describe further with reference to FIGS. 9 and 10). Thus, signal processing parameters used by the signal processing system 114 while operating in the first operational mode 116 are selected improve detection of the keyword in the far-field acoustic environment 110.

The signal processing system 114 may operate in the second operational mode 118 during a second time period. The second time period begins when a keyword is detected and ends when an end of a voice input following the keyword is detected. Thus, the second time period may correspond to an active period in which the apparatus 100 is receiving and processing voice input. While operating in the second operational mode 118, the signal processing system 114 is optimized (or otherwise configured) to detect the voice input in the far-field acoustic environment 110. For example, in the second operational mode 118, the signal processing system 114 may cease updating adaptive signal processing parameters and may use parameters that were in use when the keyword was detected. As another example, in the second operational mode 118, the signal processing system 114 may modify certain signal processing parameters, such as beamformer parameters or nullformer parameters, based on a direction of arrival of sound corresponding to the keyword. In this example, the modified signal processing parameters may facilitate focusing the voice recognition process on a location of a source (or sources) of the keyword or on a region or zone from which the keyword was received. Thus, signal processing parameters used by the signal processing system 114 while operating in the second operational mode 118 are selected improve recognition of the voice input in the far-field acoustic environment 110 after detecting the keyword.

The apparatus 100 facilitates processing of sound of the far-field acoustic environment 110 by providing feedback, such as the control signal 126, from the keyword detection system 122 to the signal processing system 114. The feedback may include a signal that instructs (or otherwise causes) the signal processing system 114 to change operational modes. Changing operational modes of the signal processing system 114 based on detection of a keyword enables the signal processing system 114 to use a first set of signal processing parameters (or first subsystems of the signal processing system 114) to monitor the far-field acoustic environment 110 for keywords, and to use a second set of signal processing parameters (or second subsystems of the signal processing system 114) to receive and process voice input from the far-field acoustic environment 110.

Figure 3:
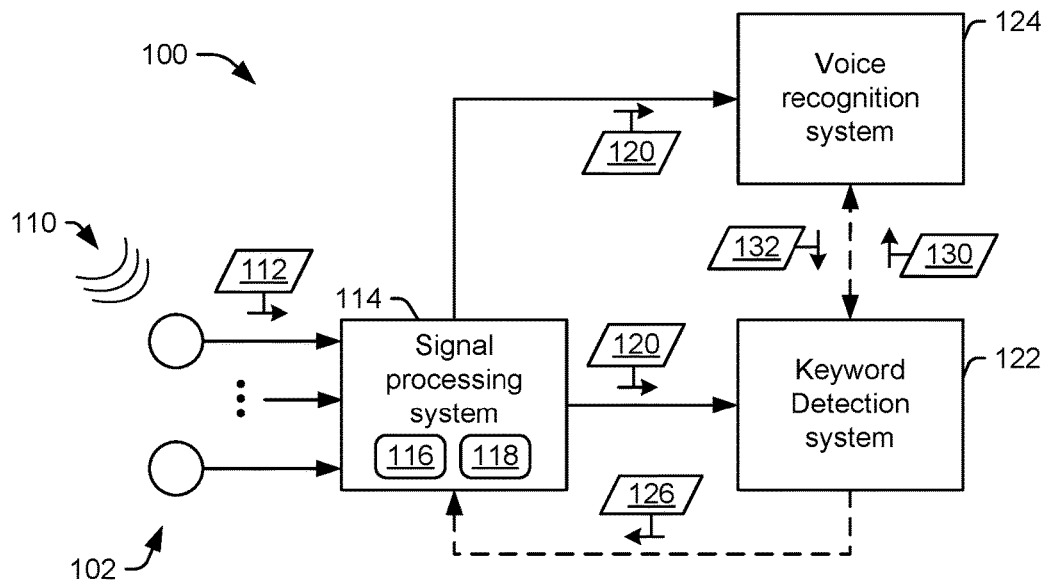
FIG. 3 is a block diagram illustrating another particular implementation of the apparatus of FIG. 1.
Figure 4:
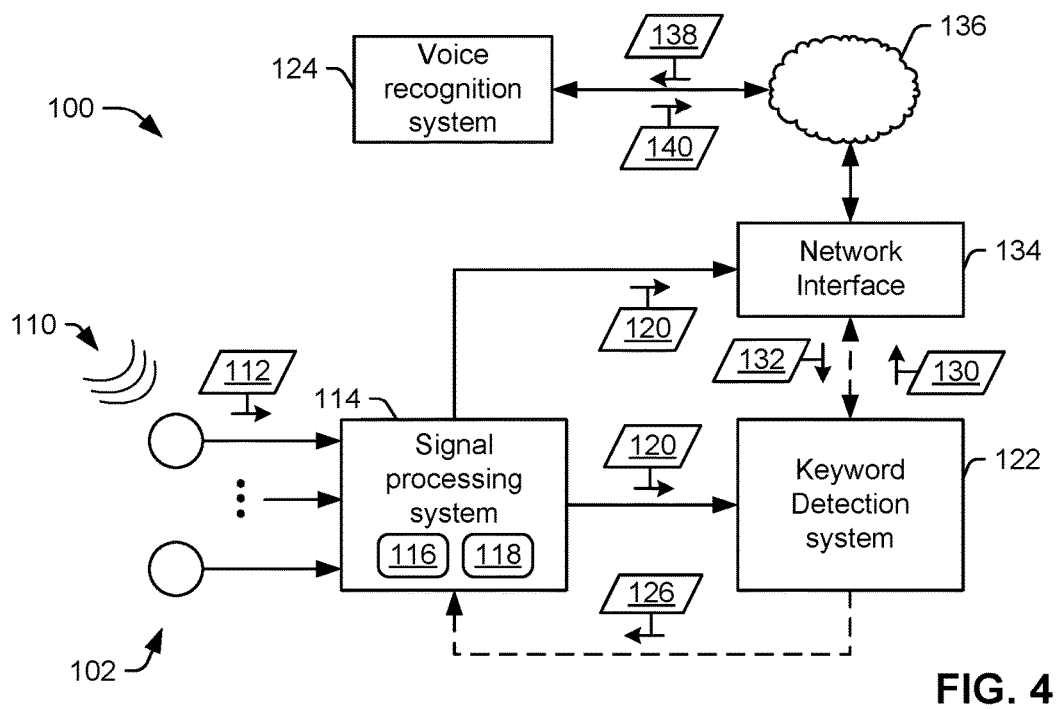
FIG. 4 is a block diagram illustrating another particular implementation of the apparatus of FIG. 1.

FIGS. 2-4 illustrate other arrangements of the keyword detection system 122 and the voice recognition system 124 in other implementations of the apparatus 100. For example, as explained above in FIG. 1, the keyword detection system 122 is illustrated as a subsystem or portion of the voice recognition system 124. However, as illustrated in FIGS. 2-4, the keyword detection system 122 may be distinct from the voice recognition system 124.

FIG. 2 illustrates a particular implementation of the apparatus 100 of FIG. 1 in which the keyword detection system 122 receives the processed audio signals 120 from the signal processing system 114 and performs keyword detection. After detecting a keyword based on the processed audio signals 120, the keyword detection system 122 sends at least a subset 128 of the processed audio signals 120 to the voice recognition system 124. The subset 128 of the processed audio signals 120 may include portions of the processed audio signals 120 that correspond to the keyword or may begin following the portions of the processed audio signals 120 that correspond to the keyword. Thus, in FIG. 2, the keyword detection system 122 and the voice recognition system 124 are distinct systems or components of the apparatus 100, and the keyword detection system 122 provides at least the subset 128 of the processed audio signals 120 to the voice recognition system 124 after the keyword detection system 122 detects a keyword.

In additional to sending the subset 128 of the processed audio signals 120, the keyword detection system 122 may send a control signal 130 to the voice recognition system 124. For example, the control signal 130 may cause the voice recognition system 124 to transition to an active state from a standby state. Alternately, on in addition, the control signal 130 may provide the voice recognition system 124 with information about the subset 128 of the processed audio signals 120, such as an indication of which keyword (of a set of keywords) was detected or which portion (e.g., which frame) of the subset 128 of the processed audio signals 120 corresponds to a beginning or ending of the keyword.

The voice recognition system 124 is configured to process the subset 128 of the processed audio signals 120 to detect a voice input that follows the keyword, and to initiate an action based on content of the voice input. Additionally, after detecting an end of the voice input, the voice recognition system 124 may send a signal 132 to the keyword detection system 122. The signal 132 may cause the signal processing system 114 to change operating modes. For example, when the keyword is detected, the keyword detection system 122 may send the control signal 126 to the signal processing system 114, and the signal processing system 114 may change from operating in the first operational mode 116 to operating in the second operational mode 118. In this example, when the end of the voice input is detected, the voice recognition system 124 may send the signal 132 to the keyword detection system 122. Based on the signal 132, the keyword detection system 122 may send a second control signal 126 to the signal processing system 114, and the signal processing system 114 may change from operating in the second operational mode 118 to operating in the first operational mode 116. Although the signal 132 is illustrated in FIG. 2 as being sent from the voice recognition system 124 to the keyword detection system 122, in other implementations, the signal 132 may be sent to other subsystems or components of the apparatus 100 in addition to, or instead of, the keyword detection system 122. To illustrate, in some implementations, the voice recognition system 124 sends the signal 132 to the signal processing system 114.

FIG. 3 illustrates another particular implementation of the apparatus 100 of FIG. 1. In FIG. 3, the keyword detection system 122 receives the processed audio signals 120 from the signal processing system 114 and performs keyword detection. After detecting a keyword based on the processed audio signals 120, the keyword detection system 122 sends the control signal 130 to the voice recognition system 124. As explained above, the control signal 130 may cause the voice recognition system 124 to transition to an active state from a standby state. Alternately, on in addition, the control signal 130 may provide the voice recognition system 124 with information about which portion (e.g., which frame) of the processed audio signals 120 corresponds to a beginning or ending of the keyword.

The voice recognition system 124 may receive the processed audio signals 120 from the signal processing system 114 to detect a voice input that follows the keyword and to initiate an action based on content of the voice input, as explained above. After detecting an end of the voice input, the voice recognition system 124 may send the signal 132 to the keyword detection system 122 (or to another component or subsystem of the apparatus 100) to cause the signal processing system 114 to change operating modes.

Thus, in FIG. 3, the keyword detection system 122 and the voice recognition system 124 are distinct systems or components of the apparatus 100, and the voice recognition system 124 receives the processed audio signals 120 from the signal processing system 114.

FIG. 4 illustrates another particular implementation of the apparatus 100 of FIG. 1. In FIG. 4, the voice recognition system 124 is not a component of the apparatus 100. Rather, the apparatus 100 communicates with the voice recognition system 124 via a network 136 (such as a wireless network, a wireline network, or a hybrid network).

In the implementation illustrated in FIG. 4, the keyword detection system 122 receives the processed audio signals 120 from the signal processing system 114 and performs keyword detection. After detecting a keyword based on the processed audio signals 120, the keyword detection system 122 sends the control signal 130 to a network interface 134.

The network interface 134 may be coupled to the signal processing system 114, to the keyword detection system 122, or both. The network interface 134 is configured to send a signal encoding a voice input to a voice recognition device that includes the voice recognition system 124 via the network 136. For example, after the keyword detection system 122 detects the keyword, the keyword detection system 122 may send the control signal 130 to the network interface 134. Based on the control signal 130, the network interface 134 may encode at least a subset of the processed audio signals 120 to form data packets 138. The portion of the processed audio signals 120 encoded may include or correspond to the voice input that follows the keyword. Additionally, the data packets 138 may encode the control signal 130 or data based on the controls signal 130, such as information regarding a particular keyword that was detected by the keyword detection system 122. The data packets 138 may be transmitted to the voice recognition system 124 via the network 136.

The voice recognition system 124 analyzes data encoded in the data packets 138 to detect a voice input that follows the keyword in the processed audio signals 120. After detecting an end of the voice input, the voice recognition system 124 may send one or more packets 140 to the apparatus 100 via the network 136. The packets 140 may cause the apparatus 100 to change the operating mode of the signal processing system 114. For example, based on the packets 140, the network interface may provide a signal 132 to the keyword detection system 122, and the keyword detection system 122 may send a second control signal 126 to the signal processing system 114 to cause the operational mode of the signal processing system 114 to be changed. Although the signal 132 is illustrated in FIG. 4 as being sent from the network interface 134 to the keyword detection system 122, in other implementations, the signal 132 may be sent to other subsystems or components of the apparatus 100 in addition to, or instead of, the keyword detection system 122. To illustrate, in some implementations, the network interface 134 sends the signal 132 to the signal processing system 114.

The voice recognition system 124 may also initiate an action based on content of the voice input. Alternately, or in addition, the voice recognition system 124 may cause the apparatus 100 to initiate an action based on content of the voice input by encoding information in the packets 140 indicating the action to be initiated at the apparatus 100.

Figure 5:
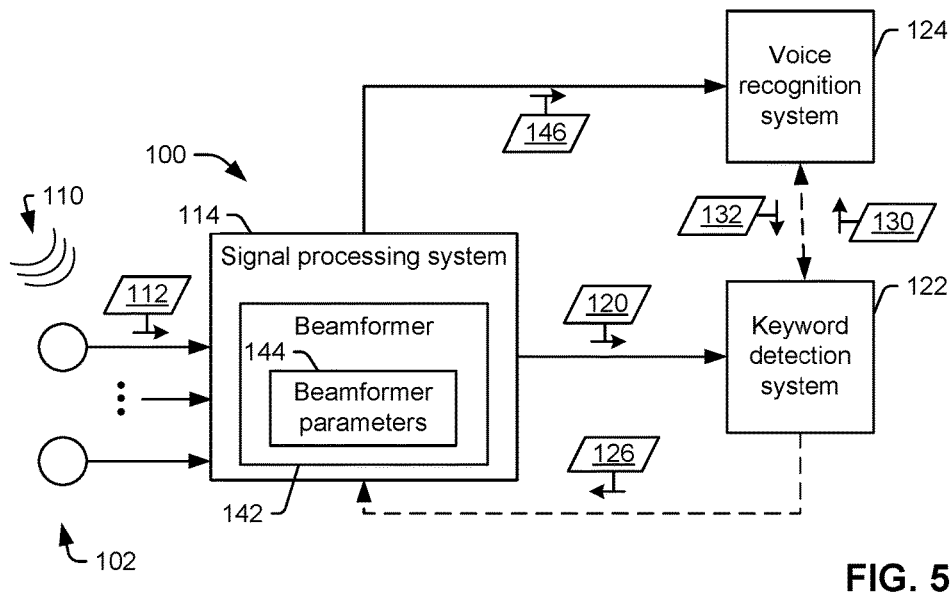
FIG. 5 is a block diagram illustrating another particular implementation of the apparatus of FIG. 1.
Figure 6:
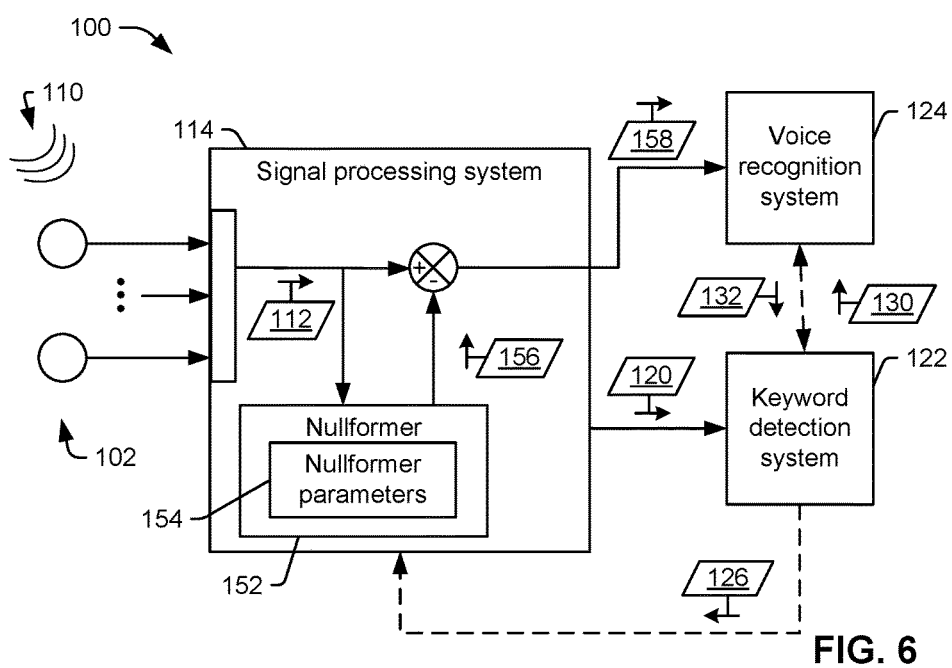
FIG. 6 is a block diagram illustrating another particular implementation of the apparatus of FIG. 1.
Figure 7:
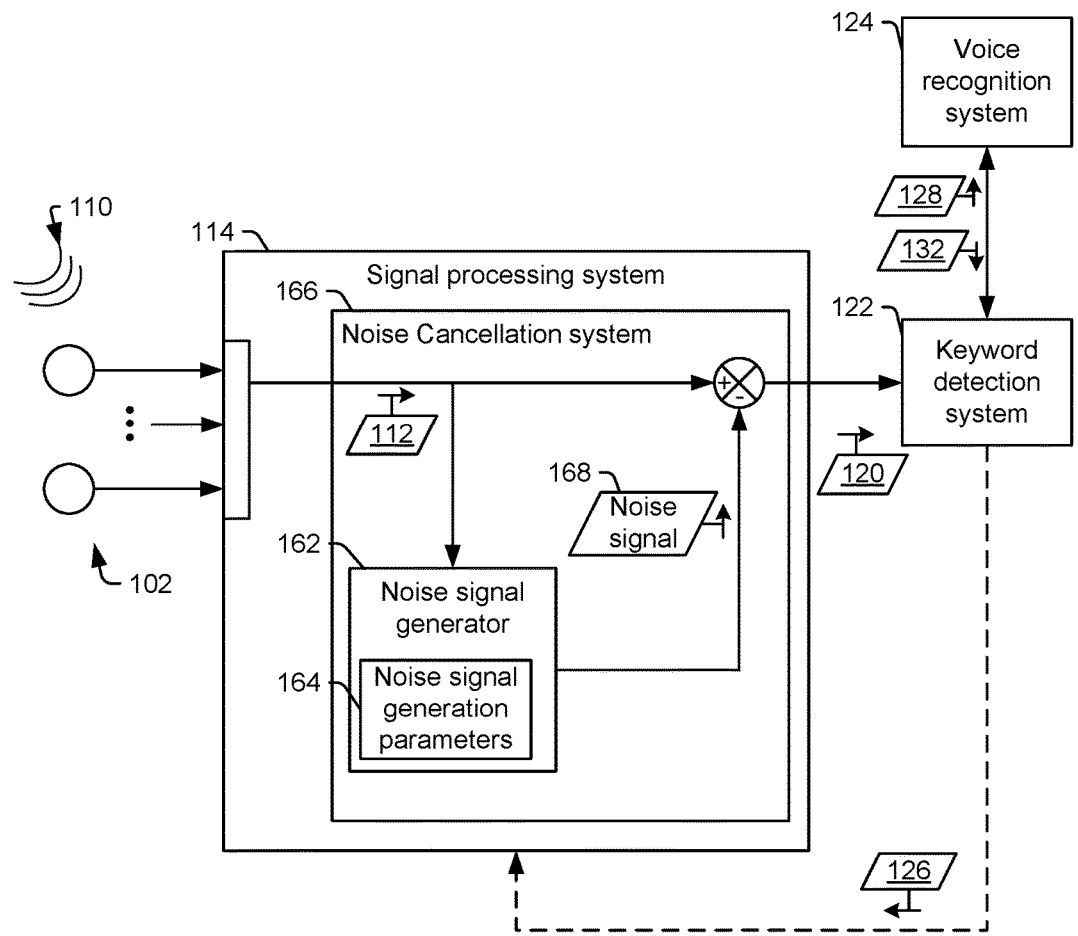
FIG. 7 is a block diagram illustrating another particular implementation of the apparatus of FIG. 1.

FIGS. 5-7 illustrate various aspects of the signal processing system 114. In particular, FIGS. 5-7 illustrate various components or subsystems that may be included in the signal processing system 114. The various components or subsystems illustrated in FIG. 5-7 are not intended to be comprehensive. Rather, in other configurations, the signal processing system 114 may include other components or subsystems to facilitate processing the audio signals 112 to generate the processed audio signals 120.

In FIGS. 5-7, the keyword detection system 122 and the voice recognition system 124 are arranged as described with reference to FIG. 3. In other implementations of the apparatus 100, the aspects of the signal processing system 114 illustrated and described with reference to FIGS. 5-7 may be used with the keyword detection system 122 and the voice recognition system 124 arranged as described with reference to FIG. 1, FIG. 2, or FIG. 4.

FIG. 5 is a block diagram illustrating another particular implementation of the apparatus 100 of FIG. 1. In the example illustrated in FIG. 5, the signal processing system 114 includes a beamformer 142. The beamformer 142 is configured to process the audio signals 112 based on a beamformer parameters 144 to generate a target audio signal 146.

In a particular implementation, the beamformer 142 is inactive in one operational mode of the signal processing system 114 and is active in another operational mode of the signal processing system 114. For example, the beamformer 142 may be inactive while the signal processing system 114 is in the first operational mode 116 and active while the signal processing system 114 is in the second operational mode 118, or vice versa. To illustrate, while the signal processing system 114 is in the first operational mode 116 and the beamformer 142 is inactive (e.g., in a standby or powered off state), the signal processing system 114 may send the processed audio signals 120 to the keyword detection system 122. Since the beamformer 142 is inactive, the processed audio signals 120 correspond to sound received from multiple directions (e.g., omnidirectional sound) within the far-field acoustic environment. When the keyword detection system 122 detects the keyword in the processed audio signals 120, the keyword detection system 122 sends the control signal 126 to the signal processing system 114. The control signal 126 may cause the signal processing system 114 to activate the beamformer 142 to generate the target audio signal 146 and to provide the target audio signal 146 to the voice recognition system 124.

In a particular implementation, the control signal 126 may include information indicating the direction of arrival of sound corresponding to the keyword. To illustrate, the processed audio signals 120 may include one processed audio signal per microphone of the multiple microphones 102 (e.g., there may be a one-to-one correspondence between the microphones 102 and the processed audio signals 120). In this illustrative example, the keyword detection system 122 may indicate the direction of arrival of sound corresponding to the keyword by indicating which of the processed audio signals 120 included the keyword. In this implementation, the beamformer parameters 144 may be set (or selected) based on the direction of arrival of the sound corresponding to the keyword. For example, the beamformer 142 may set the beamformer parameters 144 based on the control signal 126 such that the target audio signal 146 is based on the direction of arrival of the sound corresponding to an utterance that included the keyword. In this implementation, when the voice recognition system 124 detects an end of a voice input that follows the keyword, the voice recognition system 124 provides the signal 132, which causes the signal processing system 114 to deactivate the beamformer 142 (e.g., to resume operating in the first operational mode 116).

In another particular implementation, the beamformer 142 is active in both the first operational mode 116 and the second operational mode 118. In this implementation, functionality of the beamformer 142 may be changed between the first operational mode 116 and the second operational mode 118.

For example, the beamformer 142 may use different beamformer parameters 144 in the first operational mode 116 than in the second operational mode 118. To illustrate, the beamformer parameters 144 may include multiple sets of parameters (e.g., in a look-up table or other data structure). In this illustrative example, a first set of parameters of the beamformer parameters 144 may be designated for use while operating in the first operational mode 116 and one or more additional sets of parameters of the beamformer parameters 144 may be used while operating in the second operational mode 118. The particular set of parameters used when the signal processing system 114 begins operating in the second operational mode 118 may be determined based on the control signal 126.

As another example, while the signal processing system 114 is in the first operational mode 116, the beamformer 142 may continuously, regularly, or occasionally, update the beamformer parameters 144. To illustrate, the beamformer 142 may update the beamformer parameters 144 dynamically to follow a particular sound source, to avoid a particular noise source, or both. In this example, when the signal processing system 114 changes to operating in the second operational mode 118, the beamformer 142 may cease updating the beamformer parameters 144 (e.g., may use static beamformer parameters) or may change a rate at which the beamformer parameters 144 are updated. Since the signal processing system 114 changes to operating in the second operational mode 118 based on the control signal 126, and the control signal 126 is sent when the keyword detection system 122 detects the keyword in the processed audio signals 120, the static beamformer parameters used by the beamformer 142 should be directed toward a sound source that uttered the keyword. Accordingly, additional voice input from the same sound source should be captured using the static beamformer parameters, and a likelihood that the beamformer 142 will update the beamformer parameters 144 during the voice input as a result of noise or interference is reduced.

FIG. 6 is a block diagram illustrating another particular implementation of the apparatus 100 of FIG. 1. In the example illustrated in FIG. 6, the signal processing system 114 includes a nullformer 152. The nullformer 152 is configured to process the audio signals 112 based on a nullformer parameters 154 to generate a null audio signal 156 having a null in a direction corresponding to the direction of arrival of sound corresponding to the keyword.

In a particular implementation, the nullformer 152 is inactive in one operational mode of the signal processing system 114 and is active in another operational mode of the signal processing system 114. For example, the nullformer 152 may be inactive while the signal processing system 114 is in the first operational mode 116 and active while the signal processing system 114 is in the second operational mode 118. To illustrate, while the signal processing system 114 is in the first operational mode 116 and the nullformer 152 is inactive (e.g., in a standby or powered off state), the signal processing system 114 may send the processed audio signals 120 to the keyword detection system 122. Since the nullformer 152 is inactive, the processed audio signals 120 correspond to the audio signals 112 (e.g., sound received from multiple directions within the far-field acoustic environment 110). When the keyword detection system 122 detects the keyword in the processed audio signals 120, the keyword detection system 122 sends the control signal 126 to the signal processing system 114. The control signal 126 may cause the signal processing system 114 to activate the nullformer 152 to generate the null audio signal 156, which may be subtracted from the audio signals 112 to generate directional processed audio signals 158 sent to the voice recognition system 124. Subtracting the null audio signal 156 from the audio signals 112 results in removal of sound that is not from the direction of arrival of the keyword.

In a particular implementation, the control signal 126 may include information indicating the direction of arrival of sound corresponding to the keyword. To illustrate, the processed audio signals 120 may include one processed audio signal per microphone of the multiple microphones 102 (e.g., there may be a one-to-one correspondence between the microphones 102 and the processed audio signals 120). In this illustrative example, the keyword detection system 122 may indicate the direction of arrival of sound corresponding to the keyword by indicating which of the processed audio signals 120 included the keyword. In this implementation, the nullformer parameters 154 may be set (or selected) based on the direction of arrival of the sound corresponding to the keyword. For example, the nullformer 152 may set the nullformer parameters 154 based on the control signal 126 such that the directional processed audio signals 158 are based on the direction of arrival of the sound corresponding to an utterance that included the keyword. In this implementation, when the voice recognition system 124 detects an end of a voice input that follows the keyword, the voice recognition system 124 provides the signal 132, which causes the signal processing system 114 to deactivate the nullformer 152 (e.g., to resume operating in the first operational mode 116).

In another particular implementation, the nullformer 152 is active in both the first operational mode 116 and the second operational mode 118. In this implementation, functionality of the nullformer 152 may be changed between the first operational mode 116 and the second operational mode 118.

For example, the nullformer 152 may use different nullformer parameters 154 in the first operational mode 116 than in the second operational mode 118. To illustrate, the nullformer parameters 154 may include multiple sets of parameters (e.g., in a look-up table or other data structure). In this illustrative example, a first set of parameters of the nullformer parameters 154 may be designated for use while operating in the first operational mode 116, and one or more additional sets of parameters of the nullformer parameters 154 may be used while operating in the second operational mode 118. The particular set of parameters used when the signal processing system 114 begins operating in the second operational mode 118 may be determined based on the control signal 126.

As another example, while the signal processing system 114 is in the first operational mode 116, the nullformer 152 may continuously, regularly, or occasionally, update the nullformer parameters 154. To illustrate, the nullformer 152 may update the nullformer parameters 154 dynamically such that the null is generated in a direction of a particular sound source e.g., a relatively stationary sound source, such as a television). In this example, when the signal processing system 114 changes to operating in the second operational mode 118, the nullformer 152 may cease updating the nullformer parameters 154 (e.g., may use static nullformer parameters) or may change a rate at which the nullformer parameters 154 are updated.

FIG. 7 is a block diagram illustrating another particular implementation of the apparatus 100 of FIG. 1. In the example illustrated in FIG. 7, the signal processing system 114 includes a noise cancellation system 166. The noise cancellation system 166 is configured to process the audio signals 112 to generate a noise signal 168 corresponding to a noise component of the far-field acoustic environment 110 and to subtract the noise signal 168 from the audio signals 112.

The noise cancellation system 166 may include a noise signal generator 162 that generates the noise signal 168. The noise signal generator 162 may include or correspond to an adaptive filter that uses noise signal generation parameters 164 to filter out (e.g., remove or reduce) speech and speech-like components from the audio signals 112 to generate the noise signal 168. The speech and speech-like components may be identified based on sound characteristics (such as frequency, magnitude, variability, etc.) specified by the noise signal generation parameters 164. As explained further with reference to FIG. 8, in some implementations, the speech and speech-like components of the audio signals 112 may be identified based at least in part on a direction of arrival of corresponding sound. When the noise signal generator 162 includes or corresponds to an adaptive filter, the noise signal generation parameters 164 may at least occasionally be updated or modified by providing the processed audio signals 120 (or a portion thereof) to the noise cancellation system 166 as a feedback signal.

In a particular implementation, the noise cancellation system 166 is inactive in one operational mode of the signal processing system 114 and is active in another operational mode of the signal processing system 114. For example, the noise cancellation system 166 may be inactive while the signal processing system 114 is in the first operational mode 116 and active while the signal processing system 114 is in the second operational mode 118. To illustrate, while the signal processing system 114 is in the first operational mode 116 and the noise cancellation system 166 is inactive (e.g., in a standby or powered off state), the signal processing system 114 may send the processed audio signals 120 to the keyword detection system 122. When the keyword detection system 122 detects the keyword in the processed audio signals 120, the keyword detection system 122 sends the control signal 126 to the signal processing system 114. The control signal 126 may cause the signal processing system 114 to activate the noise cancellation system 166 to generate the noise signal 168 and to subtract the noise signal 168 from the audio signals 112. Subtracting the noise signal 168 from the audio signals 112 may improve detection and processing of voice input that follows the keyword.

In another particular implementation, the noise cancellation system 166 is active in both the first operational mode 116 and the second operational mode 118. In this implementation, functionality of the noise cancellation system 166 may be changed between the first operational mode 116 and the second operational mode 118.

For example, the noise cancellation system 166 may use different noise signal generation parameters 164 in the first operational mode 116 than in the second operational mode 118. To illustrate, the noise signal generation parameters 164 may include multiple sets of parameters (e.g., in a look-up table or other data structure). In this illustrative example, a first set of parameters of the noise signal generation parameters 164 may be designated for use while operating in the first operational mode 116, and one or more additional sets of parameters of the noise signal generation parameters 164 may be used while operating in the second operational mode 118. The particular set of parameters used when the signal processing system 114 begins operating in the second operational mode 118 may be determined based on the control signal 126.

As another example, while the signal processing system 114 is in the first operational mode 116, the noise cancellation system 166 may continuously, regularly, or occasionally update the noise signal generation parameters 164. In this example, when the signal processing system 114 changes to operating in the second operational mode 118, the noise cancellation system 166 may cease updating the noise signal generation parameters 164 (e.g., may use static noise signal generation parameters) or may change a rate at which the noise signal generation parameters 164 are updated.

Figure 8:
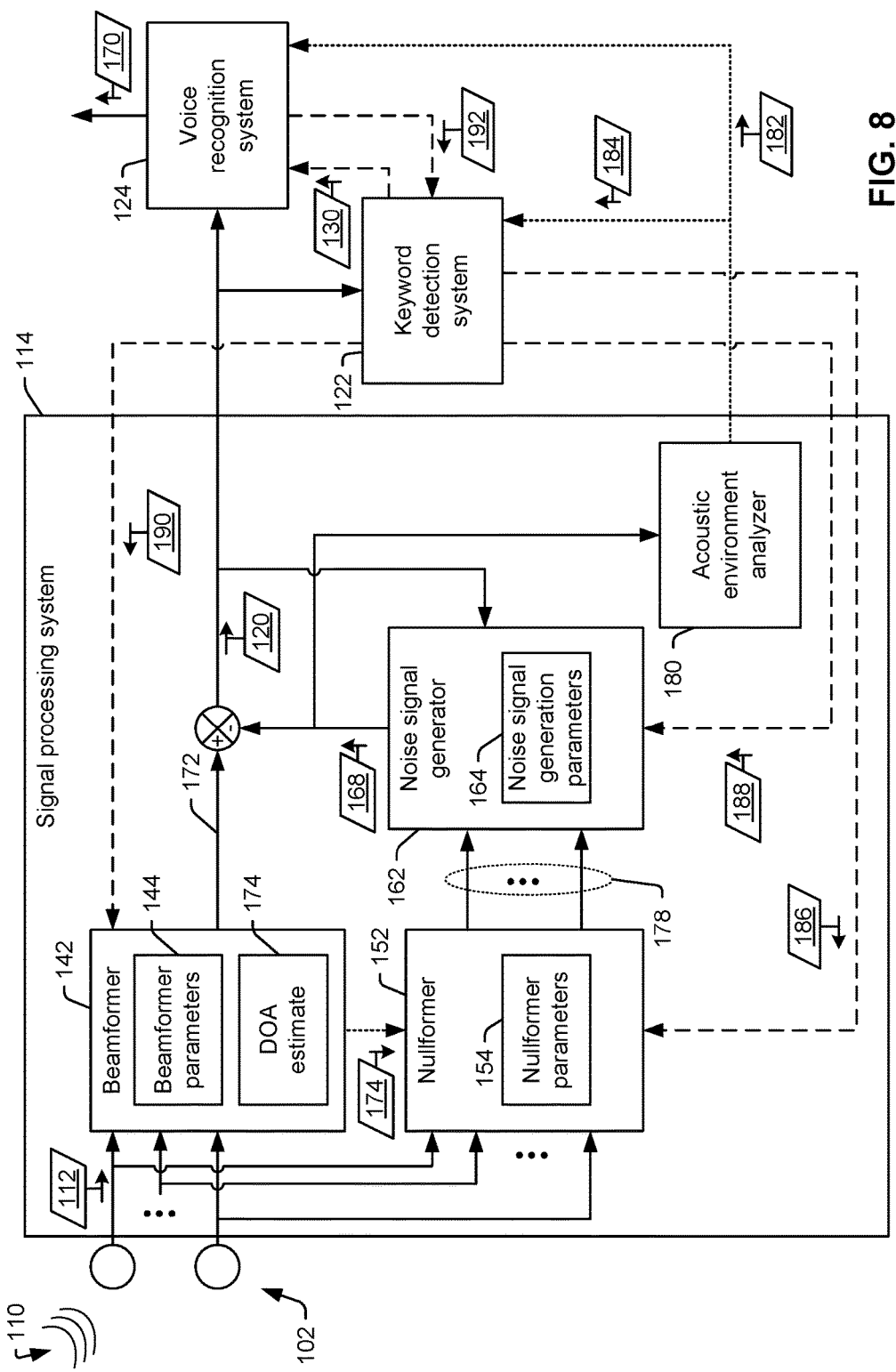
FIG. 8 is a block diagram illustrating another particular implementation of the apparatus of FIG. 1.

FIG. 8 is a block diagram illustrating another particular implementation of the apparatus 100 of FIG. 1. The implementation of FIG. 8 illustrates interactions among various components of the apparatus 100. In FIG. 8, for purposes of illustration, the apparatus 100 is arranged in the manner described with reference to FIG. 3. That is, the processed audio signals 120 are illustrated as provided by the signal processing system 114 to the keyword detection system 122 and to the voice recognition system 124. However, in other implementations (not shown), the apparatus 100 may be arranged in the manner described with reference to FIG. 1, FIG. 2, or FIG. 4. For example, the keyword detection system 122 may be a component or subsystem of the voice recognition system 124, as in FIG. 1; the keyword detection system 122 may provide the subset 128 or portion of the processed audio signals 120 to the voice recognition system 124, as in FIG. 2; or the voice recognition system 124 may be a component of a remote voice recognition device and the data packets 138 encoding at least a portion of the processed audio signals 120 may be sent to the voice recognition system 124 via the network 136, as in FIG. 4.

In FIG. 8, the signal processing system 114 include the beamformer 142, the nullformer 152, and the noise signal generator 162. Each of the beamformer 142, the nullformer 152, and the noise signal generator 162 may function as described above. For example, the beamformer 142 may function as described with reference to FIG. 5, the nullformer 152 may function as described with reference to FIG. 6, and the noise signal generator 162 may function as described with reference to FIG. 7. In FIG. 8, the beamformer 142, the nullformer 152, and the noise signal generator 162 are generally arranged and interconnected to enable the beamformer 142 to generate a target audio signal 172 based on the audio signals 112, and to enable the nullformer 152 and the noise signal generator 162 to interact to form the noise signal 168, which is subtracted from the target audio signal 172 to form the processed audio signals 120, as described in more detail below.

During operation, the signal processing system 114 receives the audio signals 112 from the microphones 102. The audio signals 112 may be routed to the beamformer 142 and to the nullformer 152. When voice input is not being received (e.g., when no keyword has been detected in the sound from the far-field acoustic environment 110 since an end of a previous voice input was detected), the signal processing system 114 may operate in the first operational mode 116. When voice input is being received and processed (e.g., when a keyword has been detected in the sound from the far-field acoustic environment 110 and an end of a voice input following the keyword has not been detected), the signal processing system 114 may operate in the second operational mode 118.

While the signal processing system 114 is operating in the first operational mode 116, the beamformer 142 may be inactive. Alternative, the beamformer 142 may be active and may apply a first set of the beamformer parameters 144 to the audio signals 112 to generate the target audio signal 172. For example, the first set of the beamformer parameters 144 may include static beamformer parameters that divide the far-field acoustic environment 110 into multiple zones, as described further with reference to FIGS. 9 and 10. In another example, the first set of the beamformer parameters 144 may include beamformer parameters that generate a multidirectional or omnidirectional beam (e.g., a beam that captures sound from most or all of the far-field acoustic environment 110).

In yet another example, the first set of the beamformer parameters 144 may be dynamically generated by the beamformer 142 using a speaker tracking process. To illustrate, the beamformer 142 may continuously, periodically, regularly, or occasionally estimate a direction of arrival (DOA) (e.g., DOA estimate 174) indicating a direction of arrival of sound that corresponds to speech (or sound that has characteristics similar to speech). In this example, the first set of the beamformer parameters 144 may be determined based on the DOA estimate 174. Thus, the target audio signal 172 may encode sound received from a direction corresponding to the DOA estimate 174. If more than one sound source is present in the far-field acoustic environment, the beamformer 142 may track multiple speakers, generate multiple DOA estimates 174 corresponding to the multiple speakers, and generate multiple target audio signals 172.

While the signal processing system 114 is operating in the first operational mode 116, the nullformer 152 may be inactive. Alternative, the nullformer 152 may be active and may apply a first set of the nullformer parameters 154 to the audio signals 112 to generate one or more null audio signals 178. For example, the first set of the nullformer parameters 154 may include static nullformer parameters that generate a null in the one or more null audio signals 178 in a direction corresponding to a relatively stationary, known source of noise or interference, such as a television.

In yet another example, the first set of the nullformer parameters 154 may be dynamically generated by the nullformer 152 based on the DOA estimate 174. In this example, the first set of the nullformer parameters 154 may cause the nullformer 152 to generate a null in a direction corresponding to the DOA estimate 174. Thus, the null audio signals 178 may encode sound received from directions other than a direction corresponding to the DOA estimate 174. If more than one sound source is present in the far-field acoustic environment 110, the beamformer 142 may generate multiple DOA estimates, and the nullformer 152 may generate multiple nulls in the null audio signals 178, e.g., one null per sound source.

The null audio signals 178 may be provided to the noise signal generator 162. While the signal processing system 114 is operating in the first operational mode 116, the noise signal generator 162 may be inactive. For example, the null audio signals 178 may be subtracted from the target audio signal 172 to form the processed audio signal 120. Alternative, the noise signal generator 162 may be active and may apply a first set of the noise signal generation parameters 164 to the null audio signals 178 to generate the noise signal 168. For example, the first set of the noise signal generation parameters 164 may include static noise signal generation parameters. In yet another example, the noise signal generator 162 may function as an adaptive filter in the first operational mode 116. To illustrate, the first set of the noise signal generation parameters 164 may be dynamically generated by the noise signal generator 162 based on a feedback signal including at least a portion of the processed audio signal 120.

The noise signal 168 may be subtracted from the target audio signal 172 to generated the processed audio signal 120. Additionally, in some implementations, the noise signal 168 may be provided to an acoustic environment analyzer 180. The acoustic environment analyzer 180 may use the noise signal 168 to generate data descriptive of the far-field acoustic environment 110. For example, the acoustic environment analyzer 180 may use the noise signal 168 to determine a signal-to-noise ratio, a noise type indicator, or a combination thereof. The acoustic environment analyzer

180 may send the data descriptive of the far-field acoustic environment 110 via a signal 184 to the keyword detection system 122, via a signal 182 to the voice recognition system 124, or both. The keyword detection system 122 may use the data descriptive of the far-field acoustic environment 110 to improve keyword detection. For example, the keyword detection system 122 may use the data descriptive of the far-field acoustic environment 110 to set (or select) a confidence threshold for keyword detection, to select or modify a keyword detection process, etc. Likewise, the voice recognition system 124 may use the data descriptive of the far-field acoustic environment 110 to improve voice recognition. For example, the voice recognition system 124 may use the data descriptive of the far-field acoustic environment 110 to set (or select) a confidence threshold for speech, to select or modify a speech recognition process, etc.

In FIG. 8, the processed audio signals 120 are provided to the keyword detection system 122 and to the voice recognition system 124. Before the keyword detection system 122 detects a keyword, the voice recognition system 124 may be inactive (e.g., in a powered down or standby state). In response to detecting a keyword in the processed audio signals 120, the keyword detection system 122 sends the signal 130 to the voice recognition system 124. The signal 130 may activate the voice recognition system 124. Additionally, the signal 130 may indicate a portion of the processed audio signals 120 that includes the keyword or that follows the keyword.

The keyword detection system 122 may also send one or more control signals to the signal processing system 114 or to components or subsystems of the signal processing system 114. In the example illustrated in FIG. 8, the keyword detection system 122 sends control signals 186, 188, 190 to the nullformer 152, the noise signal generator 162, and the beamformer 142, respectively. In other implementations, the keyword detection system 122 sends more control signals, fewer control signals, or different control signals. To illustrate, the keyword detection system 122 may send a single control signal (such as the control signal 126 of FIGS. 1-7) to the signal processing system 114. Alternatively, the keyword detection system 122 may send an additional control signal (not shown) to the acoustic environment analyzer 180 or to another component or subsystem of the signal processing system 114. As another alternatively, the keyword detection system 122 may send the control signals 188, 190 and not the control signal 186. In this alternative, the operation of the nullformer 152 may remain unchanged between the first operational mode 116 and the second operational mode 118.

The control signals 186, 188, 190 cause the signal processing system 114 to change from operating in the first operational mode 116 to operating in the second operational mode 118. While the signal processing system 114 is operating in the second operational mode 118, the beamformer 142 may apply static beamformer parameters that divide the far-field acoustic environment 110 into multiple zones, as described further with reference to FIGS. 9 and 10. In another example, the beamformer 142 may apply a second set of the beamformer parameters 144 (distinct from the first set of the beamformer parameters 144). The second set of the beamformer parameters 144 may generate a beam directed toward a sound source associated with an utterance that included the keyword. For example, the control signal 190 may include information indicating a direction of arrival of sound corresponding to the keyword. In this example, the DOA estimate 174 may be updated to correspond to the direction of arrival of the sound corresponding to the keyword, and the second set of the beamformer parameters 144 may be generated (or updated) to generate a beam based on the DOA estimated 174. Thus, in this example, the target audio signal 172 encodes sound received from the direction of arrival of sound corresponding to the keyword.

If the beamformer 142 uses a speaker tracking process, the speaker tracking process may continue in the second operational mode 118 or may be discontinued (e.g., the second set of the beamformer parameters 144 may be static). If the speaker tracking process continues to be used in the second operational mode 118, the beamformer 142 continuously, periodically, regularly, or occasionally generates or updates the DOA estimate 174, and the second set of the beamformer parameters 144 are determined based on the DOA estimate 174. Thus, the beam generated based on the beamformer parameters 144 may follow the speaker while the voice input is being received. Conversely, if the speaker tracking process is not used in the second operational mode 118, the DOA estimate 174 and the beam remain fixed in the direction of arrival of the sound corresponding to the keyword.

In some implementations, the beamformer 142 ceases to update the beamformer parameters 144 in response to the control signal 190. To illustrate, the beamformer 142 may update the beamformer parameters 144 occasionally while operating in the first operational mode 116 (e.g., according to a speaker tracking process) and may cease (or pause) updating the beamformer parameters 144 while operating in the second operational mode 118. In this example, values of the beamformer parameters 144 in use when the control signal 190 is received are used until another control signal is received to change the operational mode back to the first operational mode 116.

The target audio signal 172 encodes sound received from a direction corresponding to the DOA estimate 174. If more than one sound source in the far-field acoustic environment 110 that may be a speaker (as described with reference to FIG. 10), the beamformer 142 tracks the multiple sound sources using multiple DOA estimates 174 and generates multiple target audio signals 172.

While the signal processing system 114 is operating in the second operational mode 118, the nullformer 152 may apply a second set of the nullformer parameters 154 to the audio signals 112 to generate the one or more null audio signals 178. For example, the control signal 186 may include information indicating the direction of arrival of the sound corresponding to the keyword. In this example, the nullformer 152 may generate (or update) the second set of the nullformer parameters 154 to generate a null based on the direction of arrival of the sound corresponding to the keyword. In another example, the nullformer 152 may cease updating the nullformer parameters 154 in response to the control signal 186. To illustrate, the nullformer 152 may update the nullformer parameters 154 occasionally while operating in the first operational mode 116 and may cease (or pause) updating the nullformer parameters 154 while operating in the second operational mode 118. In this example, values of the nullformer parameters 154 in use when the control signal 186 is received are used until another control signal is received to change the operational mode back to the first operational mode 116.

In another example, the second set of the nullformer parameters 154 may be dynamically generated by the nullformer 152 based on the DOA estimate 174. In this example, the second set of the nullformer parameters 154 cause the nullformer 152 to generate a null in a direction corresponding to the DOA estimate 174. Thus, the null audio signals 178 encode sound received from directions other than a direction corresponding to the DOA estimate 174. If more than one sound source is present in the far-field acoustic environment 110, the beamformer 142 may generate multiple DOA estimates, and the nullformer 152 may generate multiple nulls in the null audio signals 178, e.g., one null per sound source.

The null audio signals 178 may be provided to the noise signal generator 162. While the signal processing system 114 is operating in the second operational mode 118, the noise signal generator 162 generates the noise signal 168, which is subtracted from the target audio signals 172 to form the processed audio signal 120. In some implementations, the noise signal generator 162 functions as an adaptive filter in the first operational mode 116 and ceases to adapt filter parameters (e.g., the noise signal generation parameters 164) in the second operational mode 118. In such implementations, the noise signal generator 162 may continue to use the noise signal generation parameters 164 (e.g., as static noise signal generation parameters) that are in use when the control signal 188 is received until another control signal is received to change back to operation according to the first operational mode 116.

After the keyword detection system 122 detects the keyword, the voice recognition system 124 analyzes at least a portion of the processed audio signals 120 to detect a voice input that follows the keyword. After detecting the voice input and determining content of the voice input, the voice recognition system 124 may initiate an action based on the content of the voice input. For example, the voice recognition system 124 may send a signal 170 to another device (not shown) or to another component of the apparatus 100. The signal 170 may indicate the action to be performed, may include data associated with the action, or both.

After detecting an end of the voice input, the voice recognition system 124 may send a control signal 192 indicating that an end of the voice input has been detected. In the example illustrated in FIG. 8, the control signal 192 is sent to the keyword detection system 122. In this example, the keyword detection system 122 may send one or more control signals to the signal processing system 114 to cause the signal processing system 114 to resume processing the audio signals 112 according to the first operational mode 116. In other examples, the control signal 192 is sent to one or more other components of the apparatus 100 instead or in addition to the keyword detection system 122. To illustrate, the control signal 192 may be sent to the signal processing system 114 or to a component or subsystem of the signal processing system 114, such as to the beamformer 142, the nullformer 152, the noise signal generator 162, or a combination thereof.

Figure 9:
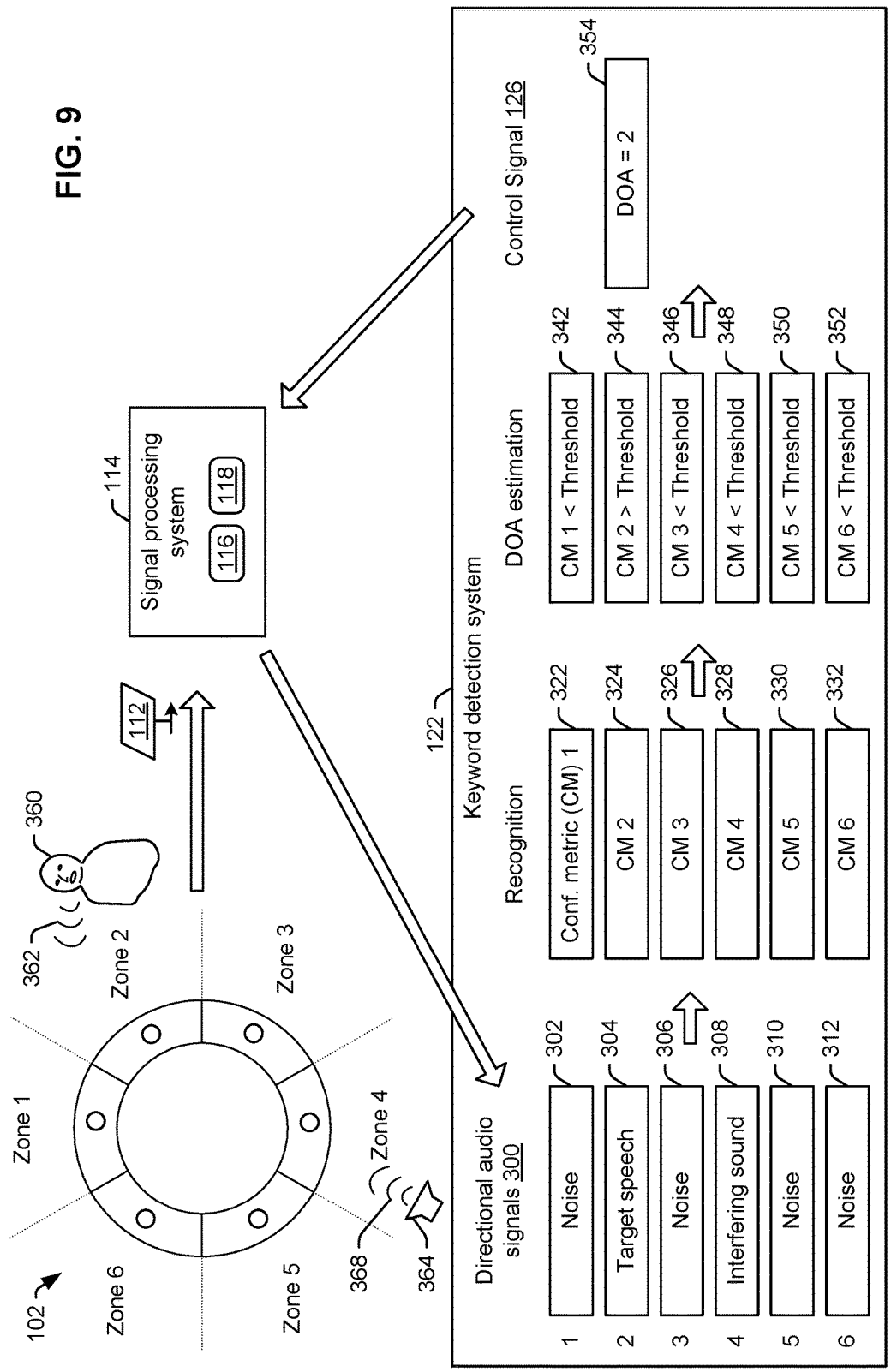
FIG. 9 is a diagram illustrating a particular aspect of the apparatus of FIG. 1.

FIG. 9 is a diagram illustrating a particular aspect of the apparatus 100 of FIG. 1. In FIG. 9, the microphones 102 are arranged in a substantially circular array. In other implementations, the microphones 102 may be arranged in an array having a different shape or configuration, such as a grid, a sphere, etc. As described further below, in the implementation illustrated in FIG. 9, the keyword detection system 122 provides direction of arrival information to the signal processing system 114 based on detecting that a particular processed audio signal of a set of processed audio signals encodes sound correspond to a keyword.

As described with reference to FIGS. 1-8, the microphones 102 provide the audio signals 112 to the signal processing system 114. In FIG. 9, the microphones 102, the signal processing system 114, or both, are configured to logically divide the far-field acoustic environment 110 into zones. For example, FIG. 9 illustrates 6 zones (zones 1-6); however, in other implementations, more than 6 zones, fewer than 6 zones, or different zones may be used. Although the zones are illustrated in FIG. 9 as approximately evenly sized and spaced, in other implementations, the zones may have different sizes or spacings. Further, in certain implementations, some of the zones may overlap one another.

The far-field acoustic environment 110 may be divided to form the zones by use of directional microphones, by use of beamforming, or both. For example, in a particular implementation, the microphones 102 include directional microphones, and each directional microphone is positioned and oriented to detect sound from a particular direction (e.g., from one of the zones). When directional microphones are used, the audio signals 112 may be provided to the signal processing system 114 via distinct channels, e.g., one zone per channel. The channels may be physically separated (e.g., by using different hardware, such as different input ports, different signal lines, etc.), or the channels may be multiplexed in a manner that enables retrieval of data related to the distinct zones, such as using frequency division multiplexing, time division multiplexing, code division multiplexing, etc.

In another implementation, the microphones 102 may include omnidirectional microphones. In this implementation, the audio signals 112 may be provided to a beamformer or beamformers of the signal processing system 114 to form the zones. For example, the signal processing system 114 may include a set of beamformers (such as the beamformer 142 of FIGS. 5 and 8), where each beamformer is associated with a corresponding zone. To illustrate, a first beamformer may be associated with zone 1. The first beamformer may receive the audio signals 112 and apply a first set of beamformer parameters to the audio signals 112 to form a first beam that is directed to form zone 1 (i.e., to limit or exclude sound from directions outside of zone 1). Similarly, a second beamformer may be associated with zone 2. The second beamformer may receive the audio signals 112 and apply a second set of beamformer parameters to the audio signals 112 to form a second beam that is directed to form zone 2 (i.e., to limit or exclude sound from directions outside of zone 2). Likewise, third, fourth, fifth, and sixth beamformers may be associated with zones 3-6, respectively, and may form respective beams corresponding to their zones. In this implementations, the beamformer parameters used by each beamformer may be static. For example, in the implementation illustrated in FIG. 9, each beamformer may use static beamformer parameters configured to form a beam encompassing approximately 60 degrees of the far-field acoustic environment (within a range of interest, such as within an average room size, e.g., several meters or several tens of meters).

After forming the zones (e.g., using beamforming) or otherwise processing the audio signals 112, the signal processing system 114 provides the directional audio signals 300 to the keyword detection system 122. The directional audio signals 300 correspond to or include the processed audio signals 120 of FIGS. 1-8 in one implementation. The directional audio signals 300 are provided to the keyword detection system 122 in a manner than enables separate processing of information (e.g., encoded sound) associated with each zone. Thus, in FIG. 9, the directional audio signals 300 are illustrated as including a first directional audio signal 302 corresponding to the zone 1, a second directional audio signal 304 corresponding to the zone 2, a third directional audio signal 306 corresponding to the zone 3, a fourth directional audio signal 308 corresponding to the zone 4, a fifth directional audio signal 310 corresponding to the zone 5, and a sixth directional audio signal 312 corresponding to the zone 6.

In the example illustrated in FIG. 9, a person 360 is present in zone 2 and is providing a voice input 362, which includes a keyword. Also in FIG. 9, a sound source 364 is present in zone 4. The sound source 364 is outputting sound 368 that may interfere with detecting the voice input 362. The other zones (e.g., zones 1, 3, 5 and 6) are silent or include noise sources (not shown). Thus, in FIG. 9, the first directional audio signal 302 includes (e.g., encodes sound corresponding to) noise, the second directional audio signal 304 includes target speech, the third directional audio signal 306 includes noise, the fourth directional audio signal 308 includes interfering sound, the fifth directional audio signal 310 includes noise, and the sixth directional audio signal 312 includes noise.

The keyword detection system 122 is configured to determine confidence metrics 322-332 corresponding to each of the directional audio signals 302-312. Each confidence metric 322-332 indicates a likelihood that the corresponding directional audio signals 302-312 encodes sound corresponding to a keyword. For example, a first confidence metric 322 indicates a likelihood that the first directional audio signal 302 encodes sound corresponding to a keyword. Likewise, a second confidence metric 324 indicates a likelihood that the second directional audio signal 304 encodes sound corresponding to a keyword. The confidence metrics may be calculated or updated continuously, regularly, periodically, or occasionally. To illustrate, the first confidence metric 322 may be updated periodically based on a sampling rate associated with the first directional audio signal 302. As another illustrative example, the first confidence metric 322 may be updated occasionally, such as when sound having a particular characteristics (such as magnitude or frequency) is detected.

Each of the confidence metric 322-332 may be compared to a confidence threshold to detect presence of a keyword and to estimate a direction of arrival of sound corresponding to the keyword. For example, as illustrated in FIG. 9, a comparison 344 indicates that the second confidence metric 324 is greater than the confidence threshold, which indicates that the second directional audio signal 304 probably (e.g., with at least a threshold confidence value) encodes sound corresponding to a keyword. Other comparisons 342, 346-352 in FIG. 9 indicate that no keyword is detected in the other directional audio signals 302, 306-312. Accordingly, the keyword detection system 122 determines that an utterance in zone 2 included the keyword, and the keyword detection system 122 estimates the direction of arrival 354 of sound associated with the utterance as corresponding to zone 2.

Based on detecting the keyword and estimating the direction of arrival, the keyword detection system 122 sends the control signal 126 to the signal processing system 114. The control signal 126 may indicate the direction of arrival 354 of the sound corresponding to the keyword. Alternatively, or in addition, the control signal 126 may indicate a zone associated with the sound that included the keyword, such as zone 2 in the example illustrated in FIG. 9.

Based on the control signal 126, the signal processing system 114 may change operational modes. For example, in the second operational mode 118, the signal processing system 114 may cease processing or outputting the directional audio signals 302, 306-312 that are associated with zones 1 and 3-6 since these zones did not include the sound corresponding to the keyword. In this example, the second directional audio signal 304 may be provided to the voice recognition system 124 (not shown in FIG. 9) to process a voice input that follows the keyword. As another example, in the second operational mode, the signal processing system 114 may continue to output the directional audio signals 302-312 to the keyword detection system 122, and may concurrently or simultaneously provide the second directional audio signal 304 to the voice recognition system 124.

Figure 10:
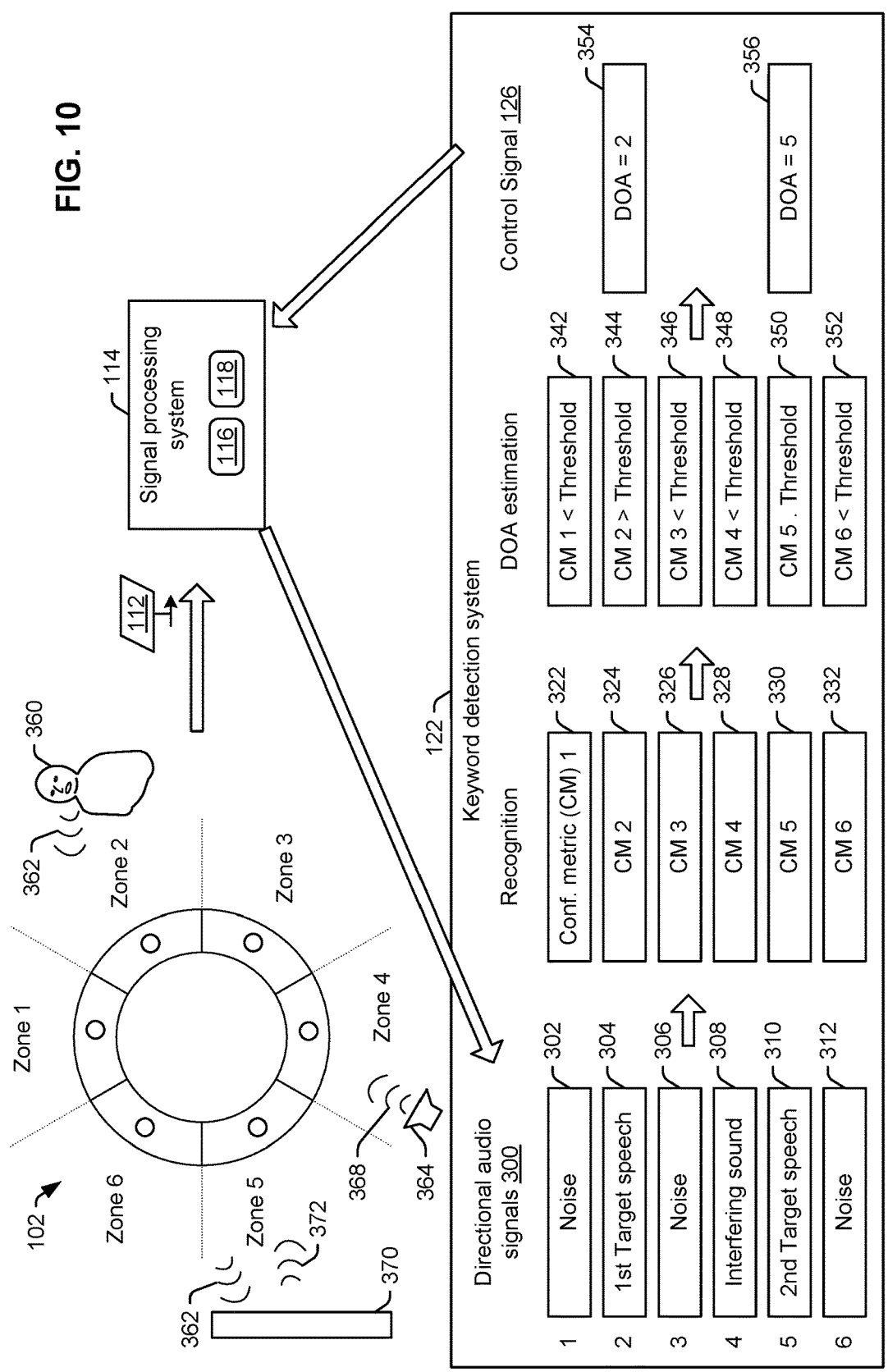
FIG. 10 is a diagram illustrating another particular aspect of the apparatus of FIG. 1.

FIG. 10 is a diagram illustrating another particular aspect of the apparatus 100 of FIG. 1. The example illustrated in FIG. 10 is the same as the example illustrated in FIG. 9 except that a reflection source (such as a wall 370) has been added near the microphones 102. Due to reflected sound 372 from the wall 370, the far-field acoustic environment 110 includes multiple possible sources of target speech. As explained above, when processing sound of a near-field acoustic environment, the source of target speech, such as the person 360, is closer to the microphones 102 than is a reflection sound source, such as the wall 370. Accordingly, the reflected sound 372 may be ignored or treated as noise. However, in the far-field acoustic environment 110, the reflection sound (e.g., the wall 370) may be closer to the microphones 102 than is the source of the target speech (e.g., the person 360). In this arrangement, the reflected sound 372 may have a volume similar to the target speech, and therefore, may interfere with reception and processing of the target speech.

In the example illustrated in FIG. 10, the first directional audio signal 302 includes (e.g., encodes sound corresponding to) noise, the second directional audio signal 304 includes first target speech, the third directional audio signal 306 includes noise, the fourth directional audio signal 308 includes interfering sound, the fifth directional audio signal 310 includes second target speech, and the sixth directional audio signal 312 includes noise. As described above, the keyword detection system 122 determines confidence metrics 322-332 corresponding to each of the directional audio signals 302-312 and compares the confidence metric 322-332 to a confidence threshold to detect presence of a keyword and to estimate a direction of arrival of sound corresponding to the keyword.

In FIG. 10, the comparison 344 indicates that the second confidence metric 324 is greater than the confidence threshold, and the comparison 350 indicates that the fifth confidence metric 330 is greater than the confidence threshold. The other comparisons 342, 346, 348, and 352 in FIG. 10 indicate that no keyword is detected in the other directional audio signals 302, 306, 308, and 312. Accordingly, the keyword detection system 122 determines that utterances in zones 2 and 5 included the keyword, and the keyword detection system 122 estimates two directions of arrival 354, 356.

Based on detecting the keyword in at least one of the directional audio signals 300, the keyword detection system 122 sends the control signal 126 to the signal processing system 114. The control signal 126 may indicate the directions of arrival 354, 356 of the sound corresponding to the keyword. Alternatively, or in addition, the control signal 126 may identify the zones associated with the sound that included the keyword, such as zones 2 and 5 in the example illustrated in FIG. 10.

Based on the control signal 126, the signal processing system 114 may change operational modes. For example, in the second operational mode 118, the signal processing system 114 may cease processing or outputting the directional audio signals 302, 306, 308, and 312 that are associated with zones 1, 3, 4 and 6 since these zones did not include the sound corresponding to the keyword. In this example, the second directional audio signal 304 and the fifth directional audio signal 310 may be provided (e.g., independently or separately) to the voice recognition system 124 to process a voice input that follows the keyword. Alternatively, as described further with reference to FIG. 11, the second directional audio signal 304 and the fifth directional audio signal 310 may be combined (e.g., to form a raked output), and the combined signal may be provided to the voice recognition system 124 to process a voice input that follows the keyword. As another example, in the second operational mode, the signal processing system 114 may continue to output the directional audio signals 302-312 to the keyword detection system 122, and may concurrently or simultaneously provide the second directional audio signal 304 and the fifth directional audio signal 310 or the raked output to the voice recognition system 124.

Figure 11:
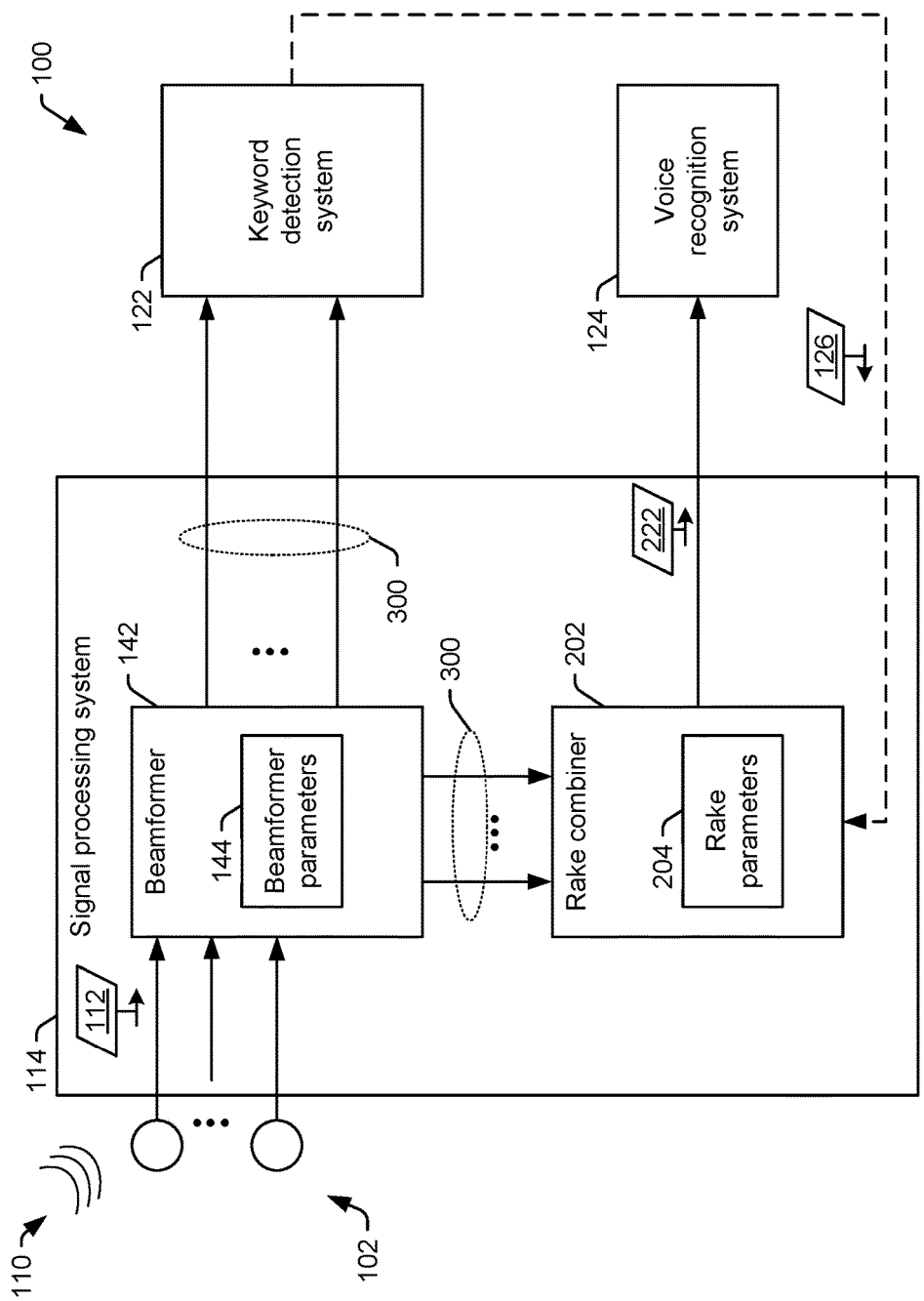
FIG. 11 is a block diagram illustrating another particular implementation of the apparatus of FIG. 1.

FIG. 11 is a block diagram illustrating another particular implementation of the apparatus 100 of FIG. 1. In FIG. 11, the signal processing system 114 includes a rake combiner 202 coupled to the beamformer 142. Other components and subsystems of the signal processing system 114 are omitted from FIG. 11 for clarity. However, in the implementation illustrated in FIG. 11, the signal processing system 114 may include other components and subsystems, such as the nullformer 152 of FIGS. 6 and 8, the noise signal generator of FIGS. 7 and 8, the acoustic environment analyzer 180 of FIG. 8, or combinations thereof.

The rake combiner 202 of FIG. 11 is configured to form a raked output 222 based on multiple directional audio signals 300 from the beamformer 142. The raked output 222 (which may also be referred to a raked beamformer output) combines two or more of the directional audio signals 300.

As described with reference to FIG. 10, when the voice input 362 is reflected (e.g., by the wall 370) in the far-field acoustic environment 110, both the voice input 362 and the reflected sound 372 may be received at the microphones 102. In this example, the beamformer 142 may generate multiple beams (where each beam corresponds to one of the directional audio signals 300) such that more than one of the multiple directional audio signals 300 encodes sound corresponding to the keyword. In FIG. 11, the multiple beams and the corresponding directional audio signals 300 may be generated using static beamformer parameters 144. Alternatively, the beamformer 142 may be configured to update or modify the beamformer parameters 144 (e.g., using a speaker tracking process) to form the multiple beams and the corresponding directional audio signals 300.

When the keyword detection system 122 detects a keyword in more than one of the directional audio signals 300, the keyword detection system 122 may send the control signal 126, which in FIG. 11, indicates which of the directional audio signals 300 included the keyword or directions of arrival associated with sound that included the keyword. To illustrate, in the example of FIG. 10, the control signal 126 may indicate that zones 2 and 5 includes sound corresponding to the keyword.

The rake combiner 202 may process the directional audio signals 300 that included the keyword (e.g., the second directional audio signal 304 and the fifth directional audio signal 310 of FIG. 10) to form the raked output 222. The raked output 222 may be provided to the voice recognition system 124 for analysis (e.g., to determine content of a voice input that follows the keyword).

The rake combiner 202 use rake parameters 204 to form the raked output 222. The rake parameters 204 may be set or modified based on the control signal 126. For example, the rake parameters 204 may indicate how many of the directional audio signals 300 are to be combined (e.g., a number of fingers of the rake) and which of the directional audio signals 300 are to be combined.

To form the raked output 222, the rake combiner 202 correlates the combined directional audio streams. For example, the rake combiner 202 may phase align the combined directional audio signals (e.g., by delaying one or more of the directional audio signals). The rake combiner 202 may also perform other processing operations, such as equalization, while combining the combined directional audio signals. As a result of the combination process, the raked output 222 may have a signal to noise ratio (SNR) that is greater than the SNR of any individual one of the combined directional audio streams. The greater SNR of the raked output 222 can improve reliability of results of the voice recognition system 124.

Figure 12:
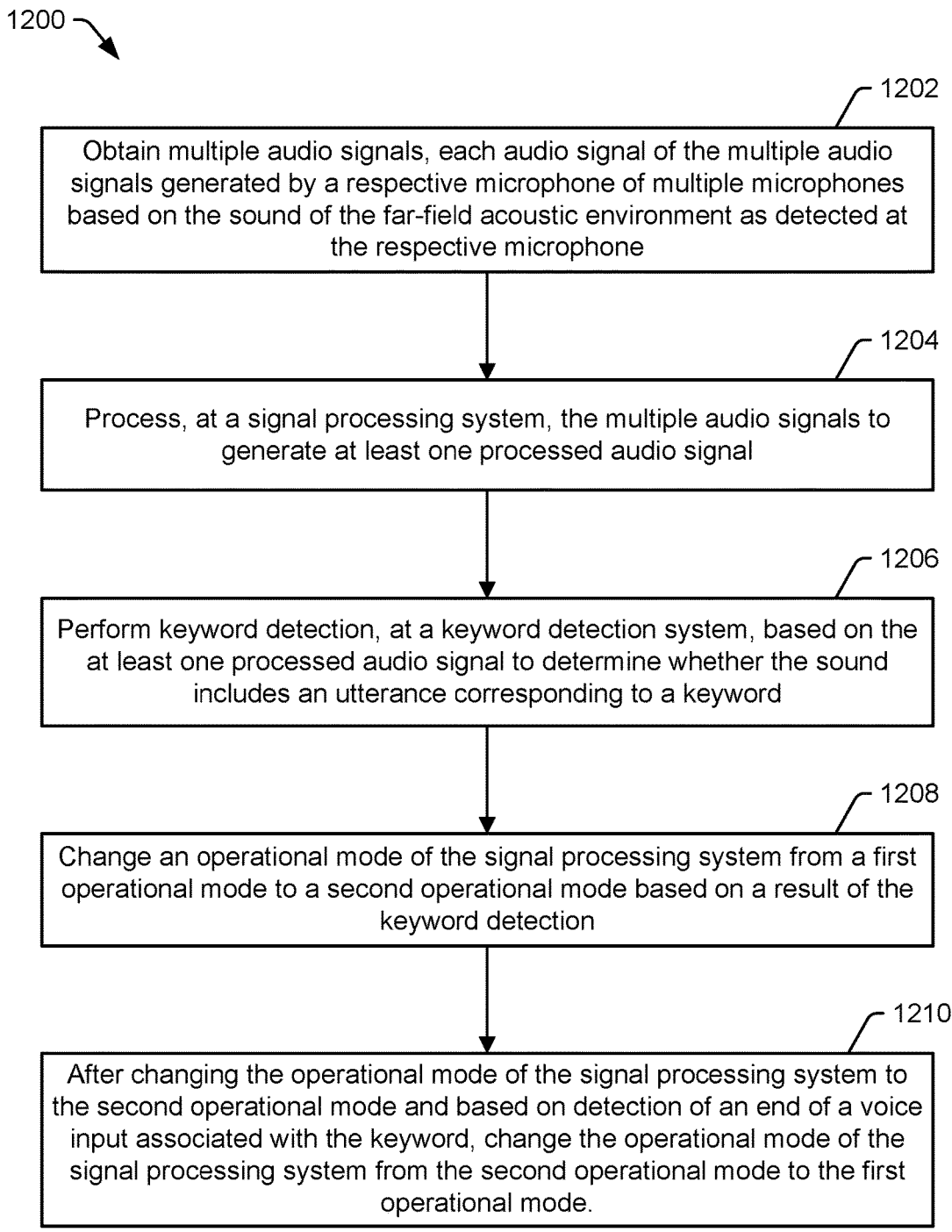
FIG. 12 is a flow chart illustrating a particular method of processing sound of a far-field acoustic environment.

FIG. 12 is a flow chart illustrating a particular method 1200 of processing sound of a far-field acoustic environment. The method 1200 may be performed by the apparatus 100 of FIGS. 1-11 or a portion or subsystem thereof. For example, the method 1200 may be performed by circuitry and/or processors of the signal processing system 114, the keyword detection system 122, and the voice recognition system 124 according to one of the implementations described with reference to FIGS. 1-11.

The method 1200 includes, at 1202, obtaining multiple audio signals. Each audio signal of the multiple audio signals is generated by a respective microphone of multiple microphones based on the sound of the far-field acoustic environment as detected at the respective microphone For example, the signal processing system 114 may receive the audio signals 112 from the microphones 102. In this example, the signal processing system 114 may receive the audio signals 112 directly from the microphones 102 or via one or more intermediate components or subsystems, such as a communication interface or a bus.

The method 1200 also includes, at 1204, processing the multiple audio signals to generate at least one processed audio signal. For example, the signal processing system 114 may process the audio signals 112 to generate the processed audio signals 120. As described further below, processing the audio signals 112 may include sampling or digitizing the audio signals 112, applying beamformer parameters to the audio signals 112, applying nullformer parameter to the audio signals 112, performing noise cancellation on the audio signals 112, using other techniques to process the audio signals 112, or a combination thereof.

The method 1200 also includes, at 1206, performing keyword detection based on the at least one processed audio signal to determine whether the sound includes an utterance corresponding to a keyword. For example, the keyword detection system 122 may perform keyword detection. In some implementations, the keyword detection system 122 is configured to detect multiple different keywords, and performing keyword detection includes determining any one (or more) of keywords.

The method 1200 also includes, at 1208, changing an operational mode of the signal processing system from a first operational mode to a second operational mode based on a result of the keyword detection. For example, the signal processing system 114 may be configured to operate in either the first operational mode 116 or in the second operational mode 118. The signal processing system 114 may be configured to change from operating in the first operational mode 116 to operating in the second operational mode 118 (or vice versa) responsive to the control signal 126.

As a specific example, the first operational mode 116 may be optimized or otherwise configured for detecting sound including a keyword within the far-field acoustic environment 110. Since the sound may be received from any direction (or from a wide angular range of directions), the first operational mode 116 may be configured to facilitate detecting and processing sound from many different directions (e.g., omnidirectional sound). However, in this specific example, after the keyword is detected, it can be assumed that a voice input following the keyword will come generally from the same direction of arrival as the sound that including the keyword. Accordingly, the second operational mode 118 may be optimized or otherwise configured for detecting sound in a narrower angular range (e.g., generally in the direction of arrival of the sound that included the keyword).

As described with respect to the various implementations of FIGS. 1-11, the audio signals can be processed using multiple distinct processes individually or in combination. For example, in some implementations, the signal processing system includes a nullformer and processing the multiple audio signals to generate at least one processed audio signal, at 1204, includes generating one or more null audio signals having a null based on a direction of arrival of a portion of the sound corresponding to the utterance. In some of these implementations, changing the operational mode of the signal processing system, at 1208, includes activating or deactivating the nullformer. In other implementations, changing the operational mode of the signal processing system, at 1208, includes updating nullformer parameters of the nullformer while operating in the first operational mode and using static nullformer parameters while operating in the second operational mode.

In particular implementations, the signal processing system includes a beamformer and processing the multiple audio signals to generate at least one processed audio signal, at 1204, includes generating a target audio signal based on a direction of arrival of a portion of the sound corresponding to the utterance. In some of these implementations, changing the operational mode of the signal processing system, at 1208, includes activating or deactivating the beamformer. In other implementations, changing the operational mode of the signal processing system, at 1208, includes updating beamformer parameters of the beamformer while operating in the first operational mode and using static beamformer parameters while operating in the second operational mode.

In particular implementations, the signal processing system includes a noise signal generator and processing the multiple audio signals to generate at least one processed audio signal, at 1204, includes generating a noise signal corresponding to a noise component of the far-field acoustic environment. In some of these implementations, changing the operational mode of the signal processing system, at 1208, includes activating or deactivating the noise signal generator. In other implementations, changing the operational mode of the signal processing system, at 1208, includes updating noise signal generation parameters of the noise signal generator while operating in the first operational mode and using static noise signal generation parameters while operating in the second operational mode. In some implementations, the noise signal may be provided to an acoustic environment analyzer, and the acoustic environment analyzer may generate data descriptive of the far-field acoustic environment based on the noise signal.

In some implementations, the signal processing system includes a nullformer and a noise signal generator. In such implementations, processing the multiple audio signals to generate at least one processed audio signal, at 1204, may include generating (e.g., by the nullformer) one or more null audio signals having a null based on a direction of arrival of a portion of the sound corresponding to the utterance. In this example, the noise signal generator may generate the noise signal based on the one or more null audio signals.

As another example, the signal processing system may include a beamformer and a noise signal generator. In this example, processing the multiple audio signals to generate at least one processed audio signal, at 1204, may include generating (e.g., by the beamformer) a target audio signal based on a direction of arrival of a portion of the sound corresponding to the utterance and subtracting the noise signal from the target audio signal to generate the at least one processed audio signal.

In particular implementations, processing the multiple audio signals to generate at least one processed audio signal, at 1204, includes generating a plurality of directional processed audio signals (including the at least one processed audio signal). Each directional processed audio signal of the plurality of directional processed audio signals encodes sound from a portion of the far-field acoustic environment associated with a corresponding direction (e.g., with one of the zones of FIGS. 9 and 10). In such implementations, the keyword detection performed, at 1206, may be based on each directional processed audio signal of the plurality of directional processed audio signals. The method 1200 may also include determining, at the keyword detection system, that at least one directional processed audio signal of the plurality of directional processed audio signals encodes a portion of the sound corresponding to the utterance and sending a control signal, from the keyword detection system to the signal processing system. The control signal may indicate a direction of arrival of the portion of the sound corresponding to the utterance based on which directional processed audio signal encodes the portion of the sound corresponding to the utterance, and the operational mode of the signal processing system may be changed based on the control signal.

In some implementations, the keyword detection system performs the keyword detection based on each directional processed audio signal by determining a confidence metric for each directional processed audio signal and generating the control signal based on which confidence metric (or metrics) satisfy a confidence threshold. In some such implementations, the signal processing system may provide each directional processed audio signal to the keyword detection system while the signal processing system is operating in the first operational mode. The signal processing system may provide only a subset of the directional processed audio signals to a voice recognition system while the signal processing system is operating in the second operational mode. For example, the subset of the directional processed audio signals may corresponds to particular directional processed audio signals that are associated with confidence metrics that satisfy the confidence threshold.

In particular implementations, processing the multiple audio signals to generate at least one processed audio signal, at 1204, includes using first beamformer parameters at a beamformer of the signal processing system to generate the plurality of directional processed audio signals while the signal processing system is operating in the first operational mode. In such implementations, changing the operational mode of the signal processing system, at 1208, includes modifying the first beamformer parameters, based on the direction of arrival of the portion of the sound corresponding to the utterance indicated by the control signal, to generate second beamformer parameters. The second beamformer parameters may be used at a beamformer to generate the at least one directional processed audio signal while the signal processing system is operating in the second operational mode. Further, in some such implementations, while the signal processing system is operating in the second operational mode, the method 1200 may include combining, at a rake combiner, two or more of the plurality of directional processed audio signals to form a raked beamformer output based on the control signal.

After changing the operational mode of the signal processing system to the second operational mode, the method 1200 also includes, at 1210, changing the operational mode of the signal processing system from the second operational mode to the first operational mode based on detection of an end of a voice input associated with the keyword. For example, the keyword detection system 122 (or the voice recognition system 124) may send a second control signal to change the operation mode of the signal processing system 114 back to the first operational mode 116.

The method 1200 may also include analyzing the voice input that follows the keyword and initiating an action based on speech content of the voice input. For example, the voice recognition system 124 may analyze the voice input to determine the speech content of the voice input and initiate an action based on speech content (e.g. by sending the signal 170). The method 1200 may also include detecting an end of the voice input and, based on detecting the end of the voice input, changing the operational mode of the signal processing system from the second operational mode to the first operational mode. For example, the voice recognition system 124 may detect the end of the voice input and cause the signal processing system 114 to change from the second operational mode 118 to the first operational mode 116 by sending a signal to the signal processing system 114 or to the keyword detection system 122. In implementations in which the voice recognition system 124 is remote from the keyword detection system 122, from the signal processing system 114, or both, the method 1200 may include sending a signal encoding the voice input to the voice recognition device via a network after detecting the keyword. For example, the network interface 134 may send data packets 138 encoding the voice input to the voice recognition system 124 via the network 136.

Figure 13:
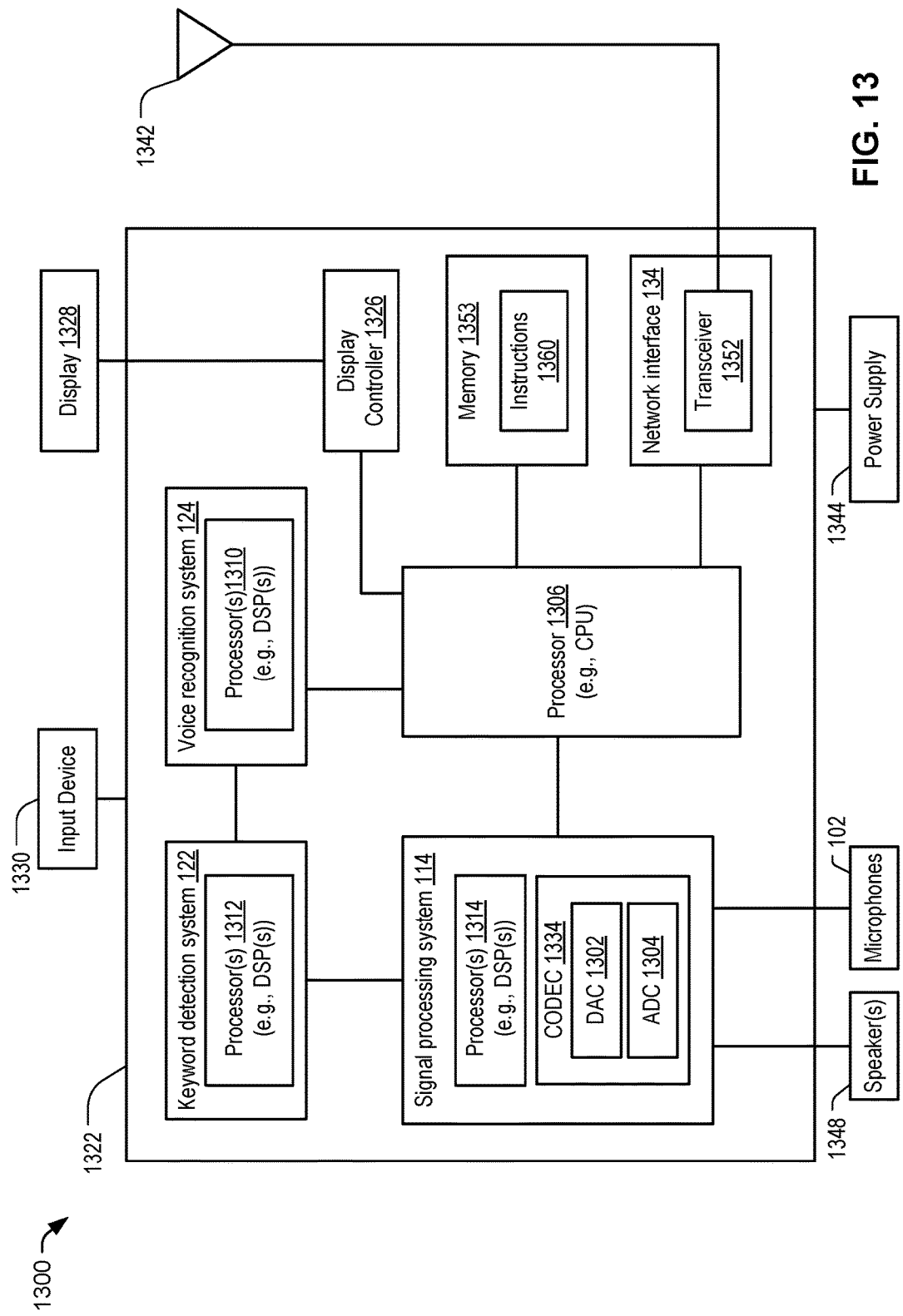
FIG. 13 is a block diagram of a device operable to process sound of a far-field acoustic environment in accordance with the systems, devices, and methods of FIGS. 1-12.

Referring to FIG. 13, a block diagram of a particular illustrative example of a device is depicted and generally designated 1300. In some implementations, the device 1300 is configured to be portable. To illustrate, a power supply 1344 of the device 1300 may include a battery, as may be the case, for example, if the device 1300 is a mobile communications device. In other implementations, the device 1300 is generally configured to be stationary (at least during use). For example, the power supply 1344 may include a power cord or power adapter configured to be coupled to a power outlet during use. To illustrate, the device 1300 may include or correspond to base station or other fixed location computing device that is configured to operate as a far-field voice assistant device. Whether the device 1300 is portable or generally stationary, the device 1300 may include or correspond to the apparatus 100 of any one or more of FIGS. 1-11. For example, the device 1300 includes the signal processing system 114 and the keyword detection system 122. The device 1300 may also include or be coupled to the microphones 102 and the voice recognition system 124.

In FIG. 13, the device 1300 includes a processor 1306 (e.g., a central processing unit (CPU)) and a memory 1353 coupled to the processor 1306. The processor 1306 may be configured to execute one or more applications based on instructions 1360 stored in the memory 1353. For example, the applications may include a voice assistant application that is executable to perform actions responsive to voice input. The actions may include, for example, playing media, controlling other devices (e.g., household appliances, thermostats, or other "internet-of-things" devices), performing internet searches, providing responses to simple questions, and so forth.

In FIG. 13, the signal processing system 114 includes a CODEC 1334. The CODEC 1334 may include a digital-to-analog converter (DAC) circuit 1302 and an analog-to-digital converter (ADC) circuit 1304. For example, the DAC circuit 1302 may be configured to receive analog audio signals (e.g., the audio signals 112) from the microphones 102 and to convert the analog audio signals to digital signals. In the example illustrated in FIG. 13, the signal processing system 114 also includes one or more processors 1314 (e.g., digital signal processors (DSPs)) configured to perform the operations of the beamformer 142, the nullformer 152, the noise signal generator 162, the acoustic environment analyzer 180, the rake combiner 202, or a combination thereof. In other implementations, at least some of the operations of one or more of the beamformer 142, the nullformer 152, the noise signal generator 162, the acoustic environment analyzer 180, and the rake combiner 202 are performed by circuitry external to the processors 1314, such as an application specific integrated circuit (ASIC), a field programmable gate array (FPGA), or another programmable circuit.

In the example illustrated in FIG. 13, the keyword detection system 122 includes one or more processors 1312 (e.g., DSPs). The one or more processors 1312 may be configured to perform the operations of the keyword detection system 122, such as detecting sound corresponding to a keyword. In other implementations, at least some of the operations of the keyword detection system 122 are performed by circuitry external to the processors 1312, such as an ASIC, a FPGA, or another programmable circuit.

In the example illustrated in FIG. 13, the voice recognition system 124 includes one or more processors 1310 (e.g., DSPs). The one or more processors 1310 may be configured to perform the operations of the voice recognition system 124, such as determining speech content of a voice input. In other implementations, at least some of the operations of the voice recognition system 124 are performed by circuitry external to the processors 1310, such as ASIC, a FPGA, or another programmable circuit.

Although FIG. 13 illustrates each of the signal processing system 114, the keyword detection system 122, and the voice recognition system 124 as including respective processors; in other implementations, one or more processors may be shared between two or more of the signal processing system 114, the keyword detection system 122, and the voice recognition system 124. To illustrate, the processors 1314 may perform both signal processing operations and keyword detection operations. Other combinations are also possible.

The device 1300 may include the network interface 134 to enable communications via the network 136 with other devices, such as a remote voice recognition device or a server that provides content (e.g., media). In the example, illustrated in FIG. 13, the network interface 134 is a wireless interface. Accordingly, the network interface 134 includes a transceiver 1352 coupled to an antenna 1342.

The device 1300 may also include a display 1328 coupled to a display controller 1326. One or more speakers 1348 may be coupled to the signal processing system 114 to provide audible output, such as media or responses to voice input. In a particular implementation, the microphones 102 include a microphone array.

One or more components of the device 1300 may be implemented via dedicated hardware (e.g., circuitry), by a processor (or processors) executing instructions to perform one or more tasks, or a combination thereof. As an example, the memory 1353 or one or more components of the processor 1306, the processors 1310, the processors 1312, or the processors 1314 may include a memory device, such as a random access memory (RAM), magnetoresistive random access memory (MRAM), spin-torque transfer MRAM (STT-MRAM), flash memory, read-only memory (ROM), programmable read-only memory (PROM), erasable programmable read-only memory (EPROM), electrically erasable programmable read-only memory (EEPROM), registers, hard disk, a removable disk, or a compact disc read-only memory (CD-ROM). The memory device may include instructions (e.g., the instructions 1360) that, when executed by a computer (e.g., one of the processors 1306, 1310, 1312, 1314), may cause the computer to perform one or more operations described with reference to FIGS. 1-12. As an example, the memory 1353 or the one or more components of the processors 1306, 1310, 1312, 1314 may include or correspond to a non-transitory computer-readable medium that includes instructions (e.g., the instructions 1360) that, when executed by a computer (e.g., a processor in the CODEC 1334, the processor 1306, and/or the processors 1310), cause the computer perform one or more operations described with reference to FIGS. 1-12.

In a particular aspect, the device 1300 may include or be included in a system-in-package or system-on-chip device 1322 (e.g., a mobile station modem (MSM)). For example, one or more of the processor 1306, 1310, 1312, 1314, the display controller 1326, the memory 1353, the CODEC 1334, and the network interface 134 may be included in a system-in-package or the system-on-chip device 1322. In this example, an input device 1330, such as a touchscreen and/or keypad, and the power supply 1344 are coupled to the system-on-chip device 1322. Moreover, in the particular example illustrated in FIG. 13, the display 1328, the input device 1330, the speakers 1348, the microphones 102, the antenna 1342, and the power supply 1344 are external to the system-on-chip device 1322. However, each of the display 1328, the input device 1330, the speakers 1348, the microphones 102, the antenna 1342, and the power supply 1344 can be coupled to a component of the system-on-chip device 1322, such as an interface or a controller.

The device 1300 may include or correspond to a wireless telephone, a mobile communication device, a mobile phone, a smart phone, a cellular phone, a laptop computer, a desktop computer, a computer, a tablet computer, a set top box, a personal digital assistant (PDA), a display device, a television, a gaming console, a music player, a radio, a video player, an entertainment unit, a communication device, a fixed location data unit, a personal media player, a digital video player, a digital video disc (DVD) player, a tuner, a camera, a navigation device, a decoder system, an encoder system, or any combination thereof.

It should be noted that various functions performed by the one or more components of the systems and devices disclosed herein are described as being performed by certain components or modules. This division of components and modules is for illustration only. In an alternate implementation, a function performed by a particular component or module may be divided amongst multiple components or modules. Moreover, in an alternate implementation, two or more components or modules may be integrated into a single component or module. Each component or module may be implemented using hardware (e.g., a FPGA device, an ASIC, a DSP, a controller, etc.), software (e.g., instructions executable by a processor), or any combination thereof.

In conjunction with described implementations, an apparatus includes means for generating multiple audio signals, each audio signal of the multiple audio signals generated based on the sound of the far-field acoustic environment. For example, the means for generating multiple audio signals may include the microphones 102 of FIGS. 1-11 and 13, one or more devices configured to generate audio signals, or a combination thereof.

The apparatus may also include means for processing the multiple audio signals to generate at least one processed audio signal. For example, the means for processing the multiple audio signals may include the signal processing system 114 or a component or subsystem thereof, such as the beamformer 142, the nullformer 152, the noise signal generator 162, the CODEC 1334, one or more of the processors 1314, one or more devices configured to process audio signals, or a combination thereof.

The apparatus may also include means for keyword detection to determine, based on the at least one processed audio signal, whether the sound includes an utterance corresponding to a keyword. For example, the means for keyword detection may include the keyword detection system 122, one or more of the processors 1312, one or more devices configured to detect a keyword in a processed audio signal, or a combination thereof.

The apparatus may also include means for changing an operational mode of a means for processing the multiple audio signals (such as the signal processing system 114 or a component or subsystem thereof). The means for changing the operational mode may be configured to change the operational mode of the means for processing the multiple audio signals from a first operational mode to a second operational mode based on a result of the keyword detection. For example, the means for changing the operational mode may include the keyword detection system 122, the voice recognition system 124, the signal processing system 114 (or a component or subsystem thereof), one or more of the processors 1310 and 1312, one or more devices configured to send a control signal to change the operational mode, or a combination thereof.

The apparatus may also include means for generating a null audio signal having a null based on a direction of arrival of a portion of the sound corresponding to the utterance. For example, the means for generating the null audio signal may include the signal processing system 114 or a component or subsystem thereof, such as the nullformer 152, one or more of the processors 1314, one or more devices configured to generate a null audio signal, or a combination thereof.

The apparatus may also include means for generating a target audio signal based on a direction of arrival of a portion of the sound corresponding to the utterance. For example, the means for generating the target audio signal may include the signal processing system 114 or a component or subsystem thereof, such as the beamformer 142, one or more of the processors 1314, one or more devices configured to generate a target audio signal, or a combination thereof.

The apparatus may also include means for generating a noise signal, where the noise signal corresponds to a noise component of the far-field acoustic environment. For example, the means for generating the noise signal may include the signal processing system 114 or a component or subsystem thereof, such as the noise cancellation system 166, the noise signal generator 162, one or more of the processors 1314, one or more devices configured to generate a noise signal, or a combination thereof.

The apparatus may also include means for analyzing the far-field acoustic environment to generate data descriptive of the far-field acoustic environment. For example, the means for analyzing the far-field acoustic environment may include the signal processing system 114 or a component or subsystem thereof, such as the acoustic environment analyzer 180, one or more of the processors 1314, one or more devices configured to generate data descriptive of the far-field acoustic environment, or a combination thereof.

The apparatus may include means for analyzing a voice input that follows the keyword. For example, the means for analyzing a voice input may include the voice recognition system 124, one or more of the processors 1310, one or more devices configured to analyzing a voice input, or a combination thereof.

The apparatus may include means for sending a signal via a network to a voice recognition device after a keyword is detected, where the signal encodes a voice input. For example, the means for sending the signal may include the network interface 134, the transceiver 1352, one or more devices configured to transmit data via a network, or a combination thereof.

The apparatus may include means for forming a raked output by combining two or more of a plurality of directional processed audio signals based on a control signal. For example, the means for forming the raked output may include the signal processing system 114 or a component or subsystem thereof, such as the rake combiner 202, one or more of the processors 1314, one or more devices configured to form a raked output, or a combination thereof.

Those of skill would further appreciate that the various illustrative logical blocks, configurations, modules, circuits, and algorithm steps described in connection with the embodiments disclosed herein may be implemented as electronic hardware, computer software executed by a processing device such as a hardware processor, or combinations of both. Various illustrative components, blocks, configurations, modules, circuits, and steps have been described above generally in terms of their functionality. Whether such functionality is implemented as hardware or executable software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in a memory device, such as RAM, MRAM, STT-MRAM, flash memory, ROM, PROM, EPROM, EEPROM, registers, hard disk, a removable disk, or a CD-ROM. An exemplary memory device is coupled to the processor such that the processor can read information from, and write information to, the memory device. In the alternative, the memory device may be integral to the processor. The processor and the storage medium may reside in an ASIC. The ASIC may reside in a computing device or a user terminal. In the alternative, the processor and the storage medium may reside as discrete components in a computing device or a user terminal.

The above description of the disclosed implementations is provided to enable a person skilled in the art to make or use the disclosed implementations. Various modifications to these implementations will be readily apparent to those skilled in the art, and the principles defined herein may be applied to other implementations without departing from the scope of the disclosure. Thus, the present disclosure is not intended to be limited to the implementations shown herein but is to be accorded the widest scope possible consistent with the principles and novel features as defined by the following claims.

What is claimed is:

1. An apparatus comprising:
multiple microphones configured to generate multiple audio signals, each microphone of the multiple microphones configured to generate a respective audio signal of the multiple audio signals based on sound of a far-field acoustic environment as detected at the microphone;
a signal processing system configured to process the multiple audio signals to generate at least one processed audio signal, the signal processing system configured to update one or more processing parameters while operating in a first operational mode and configured to use a static version of the one or more processing parameters while operating in a second operational mode; and
a keyword detection system configured to perform keyword detection based on the at least one processed audio signal to determine whether the sound includes an utterance corresponding to a keyword and, based on a determination that the utterance corresponds to the keyword, to send a control signal to the signal processing system to change an operational mode of the signal processing system from the first operational mode to the second operational mode, wherein the signal processing system is configured to use directional parameters while operating in the second operation mode, and wherein the directional parameters are determined based on a direction of arrival of a portion of the sound corresponding to the utterance.

2. The apparatus of claim 1, wherein the signal processing system is configured to generate a processed signal based on a direction of arrival (DOA) of the portion of the sound corresponding to the utterance and is configured to provide the processed signal to a voice recognition system.

3. The apparatus of claim 1, wherein the signal processing system includes a noise cancellation system configured to reduce a noise component of the far-field acoustic environment.

4. The apparatus of claim 3, wherein the one or more processing parameters include noise cancellation parameters, and wherein the noise cancellation system is configured to use adaptive noise cancellation parameters while operating in the first operational mode and is configured to use static noise cancellation parameters while operating in the second operational mode.

5. The apparatus of claim 1, wherein the signal processing system includes a beamformer, wherein the one or more processing parameters include beamforming parameters, and the beamformer is configured to use adaptive beamforming parameters while operating in the first operational mode and is configured to use static beamforming parameters while operating in the second operational mode.

6. The apparatus of claim 5, wherein the static beamforming parameters are determined based on the direction of arrival of the portion of the sound corresponding to the utterance.

7. The apparatus of claim 1, wherein the signal processing system includes a nullformer, wherein the one or more processing parameters include nullforming parameters, and the nullformer is configured to use adaptive nullforming parameters while operating in the first operational mode and is configured to use static nullforming parameters while operating in the second operational mode.

8. The apparatus of claim 1, wherein the signal processing system includes a beamformer, wherein the beamformer is configured to use adaptive beamforming parameters while operating in the first operational mode and configured to use static beamforming parameters while operating in the second operational mode.

9. The apparatus of claim 1, further comprising an acoustic environment analyzer to generate data descriptive of the far-field acoustic environment and to provide the data descriptive of the far-field acoustic environment to at least one of the keyword detection system or a voice recognition system, the data based on a noise signal corresponding to a noise component of the far-field acoustic environment.

10. The apparatus of claim 9, wherein the data descriptive of the far-field acoustic environment includes a signal-to-noise ratio, a noise type indicator, or a combination thereof.

11. The apparatus of claim 1, further comprising a voice recognition system to analyze a voice input and to initiate an action based on speech content of the voice input.

12. The apparatus of claim 11, wherein the voice recognition system is configured to generate a second control signal to change the operational mode of the signal processing system from the second operational mode to the first operational mode responsive to detection of an end of the voice input.

13. The apparatus of claim 1, further comprising a network interface coupled to the signal processing system and configured to, after the keyword detection system detects the keyword, send a signal encoding a voice input to a voice recognition device via a network.

14. The apparatus of claim 1, wherein the signal processing system is configured to generate a plurality of directional processed audio signals including the at least one processed audio signal, each directional processed audio signal of the plurality of directional processed audio signals encoding sound from a portion of the far-field acoustic environment associated with a corresponding direction, and wherein the keyword detection system is configured to perform the keyword detection based on each directional processed audio signal of the plurality of directional processed audio signals.

15. The apparatus of claim 14, wherein the keyword detection system sends the control signal to the signal processing system based on determining that at least one directional processed audio signal of the plurality of directional processed audio signals encodes the portion of the sound corresponding to the utterance, and wherein the control signal indicates a direction of arrival associated with the portion of the sound corresponding to the utterance based on which directional processed audio signal of the plurality of directional processed audio signals encodes the portion of the sound corresponding to the utterance.

16. The apparatus of claim 15, wherein the keyword detection system is configured to determine a confidence metric for each directional processed audio signal of the plurality of directional processed audio signals, and wherein the control signal is generated based on which confidence metrics satisfy a confidence threshold.

17. The apparatus of claim 16, wherein the signal processing system is configured to provide each directional processed audio signal of the plurality of directional processed audio signals to the keyword detection system while operating in the first operational mode and is configured to provide only a subset of the directional processed audio signals to a voice recognition system while operating in the second operational mode.

18. The apparatus of claim 17, wherein the subset of the directional processed audio signals corresponds to particular directional processed audio signals that are associated with confidence metrics that satisfy the confidence threshold.

19. The apparatus of claim 1, wherein the control signal indicates direction of arrival information associated with the portion of the sound corresponding to the utterance.

20. The apparatus of claim 14, wherein the signal processing system includes a beamformer and a rake combiner coupled to the beamformer, wherein the beamformer is configured to generate the plurality of directional processed audio signals and the rake combiner is configured to, while operating in the second operational mode, combine two or more of the plurality of directional processed audio signals to form a raked beamformer output based on the control signal.

21. A method for processing sound of a far-field acoustic environment, the method comprising:
   obtaining multiple audio signals, each audio signal of the multiple audio signals generated by a respective microphone of multiple microphones based on the sound of the far-field acoustic environment as detected at the respective microphone;
   processing, at a signal processing system, the multiple audio signals to generate at least one processed audio signal;
   performing keyword detection, at a keyword detection system, based on the at least one processed audio signal to determine whether the sound includes an utterance corresponding to a keyword; and
   changing an operational mode of the signal processing system from a first operational mode to a second operational mode based on a determination that the utterance corresponds to the keyword, wherein the signal processing system updates one or more processing parameters while operating in the first operational mode and uses a static version of the one or more processing parameters while operating in the second operational mode, wherein the signal processing system uses directional parameters while operating in the second operation mode, and wherein the directional parameters are determined based on a direction of arrival of a portion of the sound corresponding to the utterance.

22. The method of claim 21, further comprising after changing the operational mode of the signal processing system to the second operational mode and based on detection of an end of a voice input, changing the operational mode of the signal processing system from the second operational mode to the first operational mode.

23. The method of claim 21, further comprising generating a processed signal based on a direction of arrival (DOA) of the portion of the sound corresponding to the utterance and providing the processed signal to a voice recognition system.

24. The method of claim 21, further comprising, after detecting the keyword, sending a signal encoding a voice input to a voice recognition device via a network.

25. The method of claim 21, further comprising:
generating, at the signal processing system, a plurality of directional processed audio signals including the at least one processed audio signal, each directional processed audio signal of the plurality of directional processed audio signals encoding sound from a portion of the far-field acoustic environment associated with a corresponding direction; and
performing, at the keyword detection system, the keyword detection based on each directional processed audio signal of the plurality of directional processed audio signals.

26. The method of claim 25, further comprising:
determining, at the keyword detection system, that at least one directional processed audio signal of the plurality of directional processed audio signals encodes the portion of the sound corresponding to the utterance; and
sending a control signal, from the keyword detection system to the signal processing system, a control signal indicating direction of arrival information associated with the portion of the sound corresponding to the utterance based on which directional processed audio signal of the plurality of directional processed audio signals encodes the portion of the sound corresponding to the utterance, wherein the operational mode of the signal processing system is changed based on the control signal.

27. The method of claim 26, further comprising, while the signal processing system is operating in the second operational mode, combining two or more of the plurality of directional processed audio signals to form a raked output based on the control signal.

28. An apparatus for processing sound of a far-field acoustic environment, the apparatus comprising:
means for generating multiple audio signals, each audio signal of the multiple audio signals generated based on the sound of the far-field acoustic environment;
means for processing the multiple audio signals to generate at least one processed audio signal;
means for keyword detection to determine, based on the at least one processed audio signal, whether the sound includes an utterance corresponding to a keyword; and
means for changing an operational mode of the means for processing the multiple audio signals, the means for changing the operational mode configured to change the operational mode of the means for processing the multiple audio signals from a first operational mode to a second operational mode based on a determination that the utterance corresponds to the keyword by the means for keyword detection, wherein the means for processing the multiple audio signals is configured to update one or more processing parameters while operating in a first operational mode and is configured to use a static version of the one or more processing parameters while operating in the second operational mode, wherein the means for processing uses directional parameters while operating in the second operation mode, and wherein the directional parameters are determined based on a direction of arrival of a portion of the sound corresponding to the utterance.

29. The apparatus of claim 28, wherein the means for processing the multiple audio signals is configured to generate a plurality of directional processed audio signals including the at least one processed audio signal, each directional processed audio signal of the plurality of directional processed audio signals encoding sound from a portion of the far-field acoustic environment associated with a corresponding direction, and wherein the means for keyword detection is further configured to determine a confidence metric for each directional processed audio signal of the plurality of directional processed audio signals and to generate, based on which confidence metrics satisfy a confidence threshold, a control signal associated with changing the operational mode of the means for processing the multiple audio signals.

30. A non-transitory computer-readable medium storing instructions for processing sound of a far-field acoustic environment, the instructions executable by a processor to cause the processor to perform operations comprising:
obtaining multiple audio signals, each audio signal of the multiple audio signals generated by a respective microphone of multiple microphones based on the sound of the far-field acoustic environment as detected at the respective microphone;
processing the multiple audio signals to generate at least one processed audio signal;
performing keyword detection based on the at least one processed audio signal to determine whether the sound includes an utterance corresponding to a keyword; and
changing an operational mode of a signal processing system from a first operational mode to a second operational mode based on a determination that the utterance corresponds to the keyword, wherein the signal processing system updates one or more processing parameters while operating in a first operational mode and uses a static version of the one or more processing parameters while operating in the second operational mode, wherein the signal processing system uses directional parameters while operating in the second operation mode, and wherein the directional parameters are determined based on a direction of arrival of a portion of the sound corresponding to the utterance.

* * * * *